(12) United States Patent
Verano et al.

(10) Patent No.: US 10,049,281 B2
(45) Date of Patent: Aug. 14, 2018

(54) METHODS AND SYSTEMS FOR MEASURING HUMAN INTERACTION

(71) Applicant: Shopperception, Inc., Bedford, NY (US)

(72) Inventors: Raul Ignacio Verano, Buenos Aires (AR); Ariel Alejandro Di Stefano, Buenos Aires (AR); Juan Ignacio Porta, Buenos Aires (AR)

(73) Assignee: Shopperception, Inc., Newark, DE (US)

( * ) Notice: Subject to any disclaimer, the term of this patent is extended or adjusted under 35 U.S.C. 154(b) by 815 days.

(21) Appl. No.: 14/077,091

(22) Filed: Nov. 11, 2013

(65) Prior Publication Data

US 2014/0132728 A1    May 15, 2014

Related U.S. Application Data

(60) Provisional application No. 61/725,090, filed on Nov. 12, 2012.

(51) Int. Cl.
*H04N 13/02* (2006.01)
*G06K 9/00* (2006.01)

(52) U.S. Cl.
CPC ................ *G06K 9/00771* (2013.01)

(58) Field of Classification Search
CPC .................................................. G06K 9/00771
USPC ........... 348/46, 143, 152; 345/419; 382/154; 705/7.29, 27.1
See application file for complete search history.

(56) References Cited

U.S. PATENT DOCUMENTS

| | | | |
|---|---|---|---|
| 6,297,844 B1 * | 10/2001 | Schatz | G06K 9/00771 348/152 |
| 6,711,293 B1 | 3/2004 | Lowe | |
| 8,150,142 B2 | 4/2012 | Freedman | |
| 8,189,926 B2 | 5/2012 | Sharma et al. | |
| 8,219,438 B1 * | 7/2012 | Moon | G06Q 30/0201 705/7.29 |

(Continued)

OTHER PUBLICATIONS http://en. wikipedia. org/wiki /3D_scanner.
http://en. wikipedia. org/wiki/Kinect.

*Primary Examiner* — Y Lee
*Assistant Examiner* — Richard Carter
(74) *Attorney, Agent, or Firm* — Shartsis Friese LLP; Cecily Anne O'Regan

(57) ABSTRACT

A method and system for measuring and reacting to human interaction with elements in a space, such as public places (retail stores, showrooms, etc.) is disclosed which may determine information about an interaction of a three dimensional object of interest within a three dimensional zone of interest with a point cloud 3D scanner having an image frame generator generating a point cloud 3D scanner frame comprising an array of depth coordinates for respective two dimensional coordinates of at least part of a surface of the object of interest, within the three dimensional zone of interest, comprising a three dimensional coverage zone encompassing a three dimensional engagement zone and a computing comparing respective frames to determine the time and location of a collision between the object of interest and a surface of at least one of the three dimensional coverage zone or the three dimensional engagement zone encompassed by the dimensional coverage zone.

7 Claims, 33 Drawing Sheets

(56) References Cited

U.S. PATENT DOCUMENTS

| | | | |
|---|---|---|---|
| 2005/0146605 A1* | 7/2005 | Lipton | G06F 17/3079 348/143 |
| 2008/0306756 A1* | 12/2008 | Sorensen | G06Q 30/02 705/27.1 |
| 2010/0007717 A1 | 1/2010 | Spektor et al. | |
| 2011/0293137 A1 | 12/2011 | Guruman | |
| 2013/0321393 A1* | 12/2013 | Winder | G06T 15/04 345/419 |
| 2014/0037194 A1* | 2/2014 | Kitamura | G01B 11/24 382/154 |

* cited by examiner

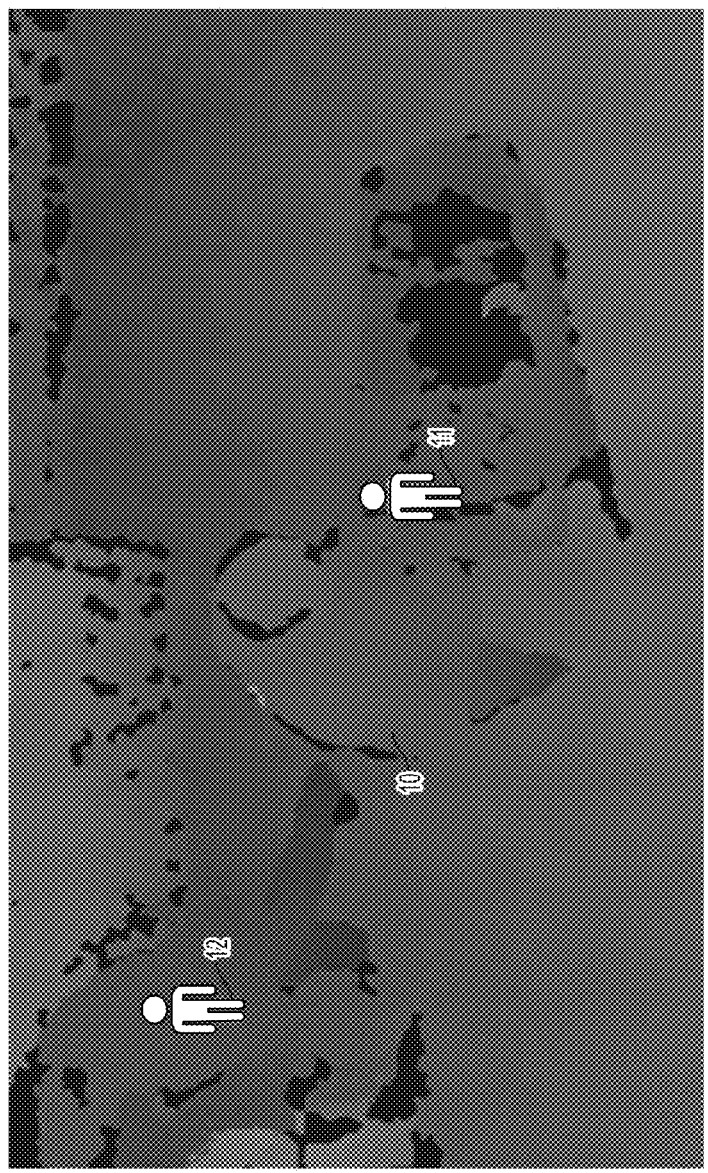

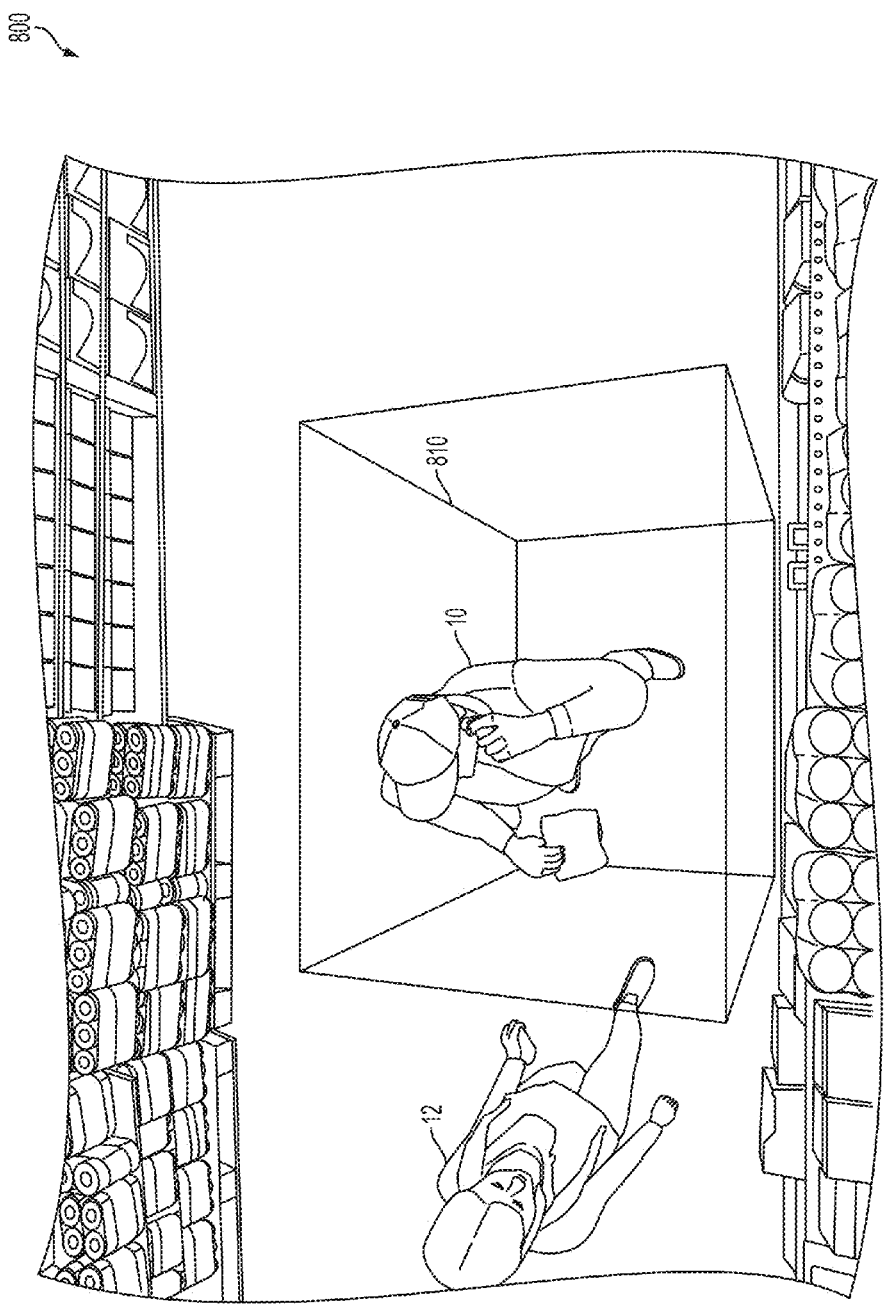

METHODS AND SYSTEMS FOR MEASURING HUMAN INTERACTION

CROSS-REFERENCE

This application claims the benefit of U.S. Provisional Application No. 61/725,090, filed Nov. 12, 2012, entitled Methods and Systems for Measuring Human Interaction, by Raul Ignacio Verano, et al., which application is incorporated herein by reference.

BACKGROUND OF THE INVENTION

Human observation is currently employed to capture field data on the behavior of shoppers. Human observation has disadvantages, including subjectivity, limitations on sample size inherent in the number of shoppers a single observer can monitor, distractions, and high cost. Another tool is video analysis, which includes video surveillance (instead of in person human observation) and automated surveillance cameras. Eye tracking, whereby the shopper is provided with a pair of glasses, is another mechanism that can be used. There are also cell phone related techniques, e.g., measuring smart phone Wi-Fi or cell phone signals, facial recognition algorithms, and RFID solutions which require that every product in the store is tagged with an RFID tag. See, e.g., U.S. Pat. No. 8,219,438 B1 to Moon et al. for Method and System for Measuring Shopper Response to Products Based on Behavior and Facial Expression issued on Jul. 10, 2012; US 2011/0293137A1 to Guruman et al. for Analysis of Three-Dimensional Scenes, published Dec. 1, 2011; U.S. Pat. No. 8,150,142 B2 to Freedman, for Depth Mapping Using Projected Patterns issued Apr. 3, 2012; and US 2010/0007717A1 to Spektor et al. for Integrated Processor for 3D Mapping, published Jan. 14, 2010. U.S. Pat. No. 6,711,293, issued to Lowe on Mar. 23, 2004, entitled Method And Apparatus For Identifying Scale Invariant Features In An Image And Use Of Same For Locating An Object In An Image discloses digitally recording visual characteristics of, e.g., a person, in order to facilitate identifying a returning person with the same ID. well known 3D scanners applicable here are discussed in http://en.wikipedia.org/wiki/3D_scanner. The Microsoft "Kinect"™, suitable for use with the claimed subject matter is discussed in http://en.wikipedia.org/wiki/Kinect.

SUMMARY OF THE INVENTION

The present disclosure is directed to a method and system for measuring and reacting to human interaction with elements in a space, such as public places (retail stores, showrooms, etc.) based on individual people's movements and location.

A person's movements and location are determinable through the use of a device providing images and depth map information, such as one or more sensors, such as structured light sensors, which can be utilized to transform image sequences and topological information into three-dimensional (3D) points in space, e.g., representing the person. Such three dimensional points in space are well known in the art and commonly referred to as a point cloud, which is utilized in the present application to refer to all of the above examples, i.e., topological information, including, as an example, surface information, 3D points, depth maps, etc. as, in general, e.g., a "point cloud." It is also well known that such "point clouds" can be created by what are referenced as 3D scanners, of which the below referenced Microsoft Kinects is an example, as discussed in http://en.wikipedia.org/wiki/3D_scanner and http://en.wikipedia.org/wiki/Kinect, referenced above. The points in a point cloud, as is well understood in the art can be associated with other information besides [position in a coordinate space, e.g., color. Point clouds are also well known to allow for the recreation of the image sequences and surface distance measurements from which set of three-dimensional (3D) points in space the point cloud is created, to, thereby, e.g., represent fully or partially the surface of an object of interest, e.g., a person.

The system allows tracking of people, e.g., from the top or the side(s) or a combination of both, and does not need to recognize people's contours from a front perspective, as is an aspect of the operation of "Kinect"™. Additionally, multiple people can be tracked without one person fully occluding another person. These points are then processed using a 3D representation of physical or conceptual locations of the public space—such as areas of interest, furniture or retail products. The dynamic outcome of these comparisons is then analyzed to determine a characterization of the interaction with one or more target elements—such as entering or leaving an area, using a piece of furniture or grabbing a product from a shelf.

The outcome of this interaction analysis can further be used to analyze behaviors and gather metrics—such as visits, visit times, interaction times, precise touch locations, element interaction sequences—and also for triggering real-time events in response to those interactions—such as advertising, playing sounds, printing coupons, vaporizing ambient sprays or firing an alarm.

It will be understood that a system and method for determining information about an interaction of a three dimensional object of interest occurring within a three dimensional zone of interest may comprise a three dimensional image sensor, of which a 3D scanner is an example, as noted above, which may comprise an image frame generator configured to generate a point cloud 3D scanner frame comprising an array of depth coordinates for respective two dimensional coordinates, i.e., a point cloud, e.g., of some or all a surface of the object of interest, within the three dimensional zone of interest, comprising a three dimensional coverage zone defined by the location and orientation of the point cloud sensor and encompassing within the three dimensional coverage zone a three dimensional engagement zone; and wherein the three dimensional image sensor frame comprises a three dimensional depth map, e.g., a point cloud, of the object of interest, e.g., a surface within the three dimensional coverage zone or within both the three dimensional coverage zone and the three dimensional engagement zone; a memory configured to store temporally separated point cloud sensor image frames; a computing device configured to compare respective temporally separated point cloud sensor image frames and determine the time and location of a collision between a surface of the object of interest and a surface of at least one of the three dimensional coverage zone or the three dimensional engagement zone encompassed by the dimensional coverage zone. At least one three dimensional sub-zone may be encompassed within one or both of the three dimensional coverage zone and the three dimensional engagement zone; and the computing device may be configured to compare respective temporally separated point cloud 3D scanner image frames; and determine the time and location of a collision between a surface of the object of interest and a surface of the at least one three dimensional sub-zone.

The system and method disclosed may comprise wherein the object of interest is a person and the surface of the object of interest is on a portion of the body of the person. The system and method may comprise the computing device being configured to utilize the time and location of the collision between the surface of the object of interest and the at least one of the surface of the three dimensional coverage zone or the three dimensional engagement zone encompassed by the dimensional coverage zone to characterize the interaction by the object of interest with another object of interest within the three dimensional coverage zone, the three dimensional engagement zone or both. The system and method may comprise the computing device configured to utilize the time and location of the collision between the surface of the object of interest and the surface of the three dimensional sub-zone encompassed by at least one of the three dimensional coverage zone or the three dimensional engagement zone to characterize the interaction by the object of interest with another object of interest within the three dimensional sub-zone.

Another object of interest may comprise a tracked product in a product location zone within the three dimensional engagement zone or a tracked product in a product location zone within the three dimensional sub-zone. The characterization of the interaction with the other object of interest may be indicative of an activity of the person being performed with the another object of interest.

A machine readable storage medium storing instructions which, when executed by a computing device, cause the computing device to perform a method, is disclosed where the method may comprise receiving from a 3D scanner a point cloud, where the 3D scanner may comprise an image frame generator generating a point cloud 3D scanner frame comprising an array of depth coordinates for respective two dimensional coordinates of a surface of the object of interest, within the three dimensional zone of interest, comprising a three dimensional coverage zone defined by the location and orientation of the point cloud 3D scanner and encompassing within the three dimensional coverage zone a three dimensional engagement zone; and wherein the point cloud 3D scanner frame may comprise a three dimensional depth map of the object of interest within the three dimensional coverage zone or within both the three dimensional coverage zone and the three dimensional engagement zone; storing in a memory temporally separated point cloud 3D scanner image frames; and comparing respective temporally separated point cloud 3D scanner image frames and determining the time and location of a collision between a surface of the object of interest and a surface of at least one of the three dimensional coverage zone or the three dimensional engagement zone encompassed by the dimensional coverage zone. At least one three dimensional sub-zone may be encompassed within one or both of the three dimensional coverage zone and the three dimensional engagement zone; and the method may further comprise comparing respective temporally separated point cloud 3D scanner image frames and determining the time and location of a collision between a surface of the object of interest and a surface of the at least one three dimensional sub-zone.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 7A-B are, respectively, a screen shot of a planogram and a digitized view of a person(s) in a three dimensional space(s);

FIGS. 8A-B are screen shots of planograms of a person(s) in a three dimensional zone(s);

DETAILED DESCRIPTION OF THE INVENTION

I. Computing Systems

The systems and methods described herein rely on a variety of computer systems, networks and/or digital devices for operation. In order to fully appreciate how the system operates an understanding of suitable computing systems is useful. The systems and methods disclosed herein are enabled as a result of application via a suitable computing system.

Figure 1A:
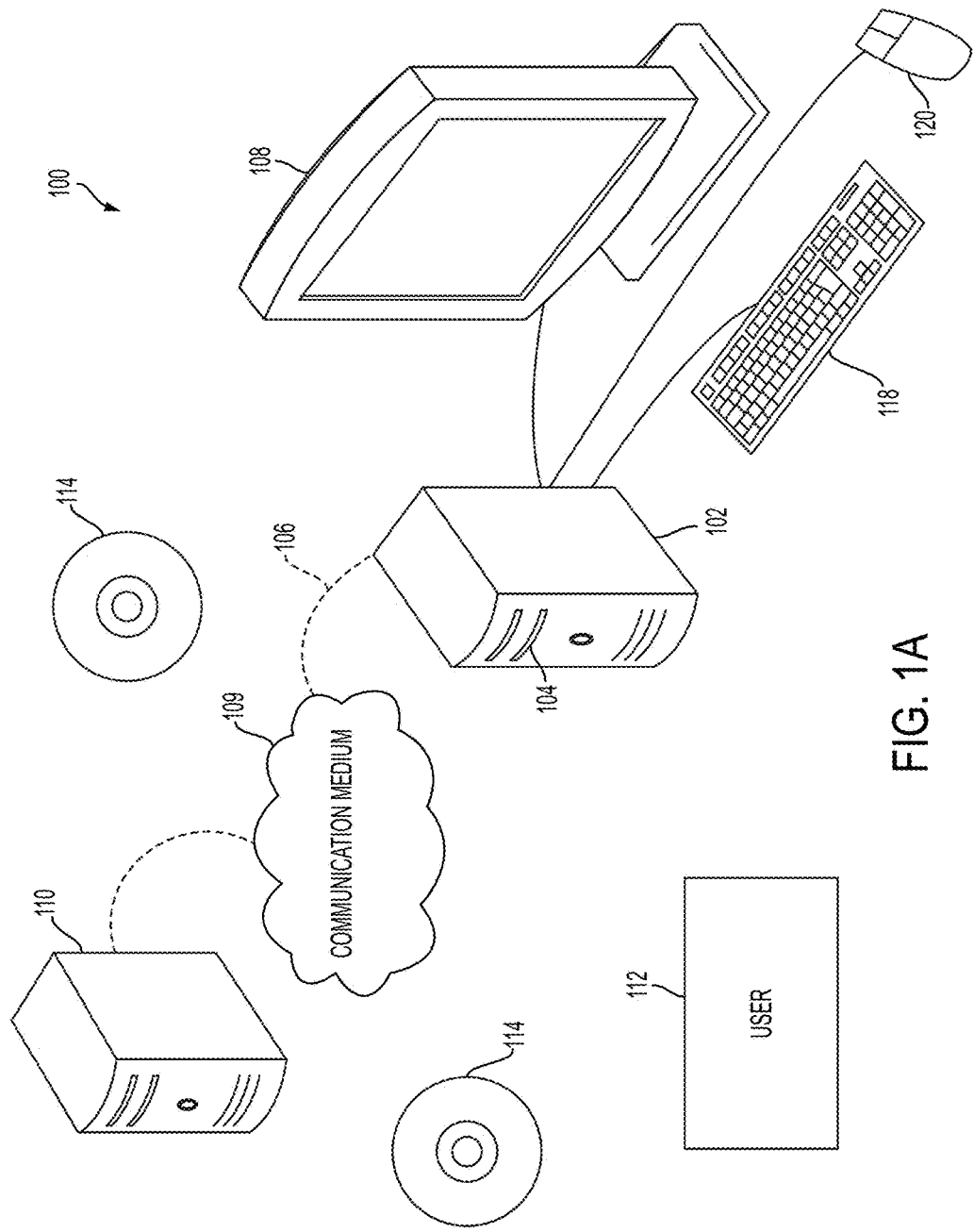
FIG. 1A is a block diagram showing a representative example of a logic device through which measuring human interaction can be achieved.

FIG. 1A is a block diagram showing a representative example logic device through which, e.g., a user 112 can utilize a browser can be accessed to implement the present invention. A computer system (or digital device) 100, which may be understood as a logic apparatus adapted and configured to read instructions from media 114 and/or network port 106, is connectable to a server 110, and has a fixed media 116. The computer system 100 can also be connected to the Internet or an intranet. The system includes central processing unit (CPU) 102, disk drives 104, optional input devices, illustrated as keyboard 118 and/or mouse 120 and optional monitor 108. Data communication can be achieved through, for example, communication medium 109 to a server 110 at a local or a remote location. The communication medium 109 can include any suitable means of transmitting and/or receiving data. For example, the communication medium can be a network connection, a wireless connection or an internet connection. It is envisioned that data relating to the present invention can be transmitted over such networks or connections. The computer system can be adapted to communicate with a participant and/or a device used by a participant. The computer system is adaptable to communicate with other computers over the Internet, or with computers via a server.

Figure 1B:
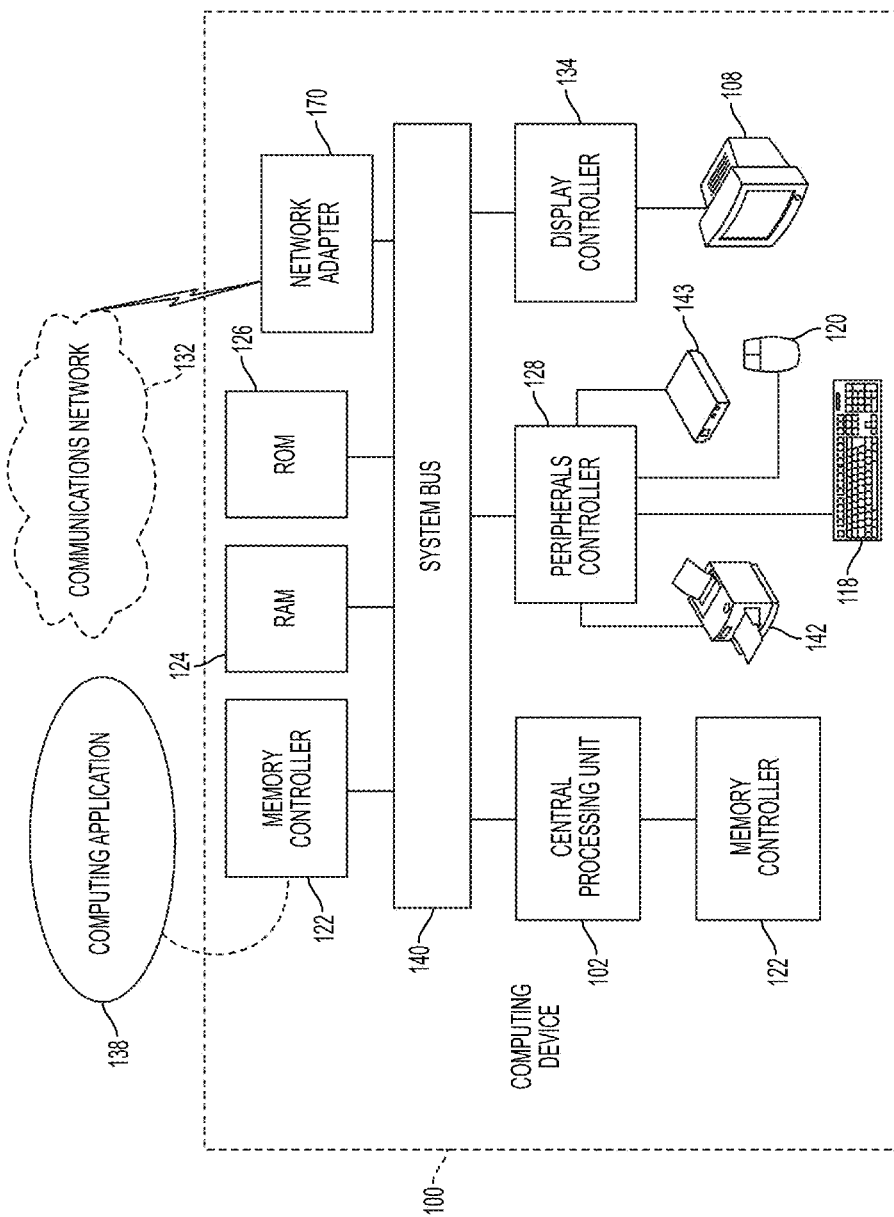
FIG. 1B is a block diagram of an exemplary computing environment through which measuring human interaction can be achieved.

FIG. 1B depicts another exemplary computing system (computing device) 100. The computing system 100 is capable of executing a variety of computing applications 138, including computing applications, a computing applet, a computing program, or other instructions for operating on computing system 100 to perform at least one function, operation, and/or procedure. Computing system 100 is controllable by computer readable storage media for tangibly storing computer readable instructions, which may be in the form of software. The computer readable storage media adapted to tangibly store computer readable instructions can contain instructions for computing system 100 for storing and accessing the computer readable storage media to read the instructions stored thereon themselves. Such software may be executed within CPU 102 to cause the computing system 100 to perform desired functions. In many known computer servers, workstations and personal computers CPU 102 is implemented by micro-electronic chips CPUs called microprocessors. Optionally, a co-processor, distinct from the main CPU 102, can be provided that performs additional functions or assists the CPU 102. The CPU 102 may be connected to co-processor through an interconnect. One common type of coprocessor is the floating-point coprocessor, also called a numeric or math coprocessor, which is designed to perform numeric calculations faster and better than the general-purpose CPU 102.

As will be appreciated by those skilled in the art, a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. A machine readable medium is a tangible storage device and the instructions are stored in a non-transitory way. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Some embodiments may be implemented in one or a combination of hardware, firmware and software. Embodiments may also be implemented as instructions stored on a non-transitory computer-readable storage medium, which may be read and executed by at least one processor to perform the operations described herein. A non-transitory computer-readable storage medium may include any mechanism for storing information in a form readable by a machine (e.g., a computer). For example, a non-transitory computer-readable storage medium may include read-only memory (ROM), random-access memory (RAM), magnetic disk storage media, optical storage media, flash-memory devices, and other non-transitory media.

In operation, the CPU 102 fetches, decodes, and executes instructions, and transfers information to and from other resources via the computer's main data-transfer path, system bus 140. Such a system bus connects the components in the computing system 100 and defines the medium for data exchange. Memory devices coupled to the system bus 140 include random access memory (RAM) 124 and read only memory (ROM) 126. Such memories include circuitry that allows information to be stored and retrieved. The ROMs 126 generally contain stored data that cannot be modified. Data stored in the RAM 124 can be read or changed by CPU 102 or other hardware devices. Access to the RAM 124 and/or ROM 126 may be controlled by memory controller 122. The memory controller 122 may provide an address translation function that translates virtual addresses into physical addresses as instructions are executed.

In addition, the computing system 100 can contain peripherals controller 128 responsible for communicating instructions from the CPU 102 to peripherals, such as, printer 142, keyboard 118, mouse 120, and data storage drive 143. Display 108, which is controlled by a display controller 163, is used to display visual output generated by the computing system 100. Such visual output may include text, graphics, animated graphics, and video. The display controller 134 includes electronic components required to generate a video signal that is sent to display 108. Further, the computing system 100 can contain network adaptor 170 which may be used to connect the computing system 100 to an external communications network 132.

II. Networks and Internet Protocol

As is well understood by those skilled in the art, the Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

The Internet Protocol (IP) enables data to be sent from one device (e.g., a phone, a Personal Digital Assistant (PDA), a computer, etc.) to another device on a network. There are a variety of versions of IP today, including, e.g., IPv4, IPv6, etc. Other IPs are no doubt available and will continue to become available in the future, any of which can be used without departing from the scope of the invention. Each host device on the network has at least one IP address that is its own unique identifier and acts as a connectionless protocol. The connection between end points during a communication is not continuous. When a user sends or receives data or messages, the data or messages are divided into components known as packets. Every packet is treated as an independent unit of data and routed to its final destination—but not necessarily via the same path.

The Open System Interconnection (OSI) model was established to standardize transmission between points over the Internet or other networks. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

III. Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (for example a transmitter and a receiver, including a single chip transceiver with an integrated transmitter, receiver and, if desired, other functions); an antenna; a processor; display; one or more audio transducers (for example, a speaker or a microphone as in devices for audio communications); electromagnetic data storage (such as ROM, RAM, digital data storage, etc., such as in devices where data processing is provided); memory; flash memory; and/or a full chip set or integrated circuit; interfaces (such as universal serial bus (USB), coder-decoder (CODEC), universal asynchronous receiver-transmitter (UART), phase-change memory (PCM), etc.). Other components can be provided without departing from the scope of the invention.

Wireless LANs (WLANs) in which a mobile user can connect to a local area network (LAN) through a wireless connection may be employed for wireless communications. Wireless communications can include communications that propagate via electromagnetic waves, such as light, infrared, radio, and microwave. There are a variety of WLAN standards that currently exist, such as Bluetooth®, IEEE 802.11, and the obsolete HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a personal computing memory card International Association (PCMCIA) card (or PC card) or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, WiMAX (Worldwide Interoperability for Microwave Access), Multiple Interface Devices (MIDs), 802.11x devices (IEEE 802.11 devices including, 802.11a, 802.11b and 802.11g devices), HomeRF (Home Radio Frequency) devices, Wi-Fi (Wireless Fidelity) devices, GPRS (General Packet Radio Service) devices, 3 G cellular devices, 2.5 G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds a mechanism to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using Internet Control Message Protocol (ICMP).

In basic IP routing (e.g., outside mobile IP), routing mechanisms rely on the assumptions that each network node always has a constant attachment point to the Internet and that each node's IP address identifies the network link it is attached to. In this document, the terminology "node" includes a connection point, which can include a redistribution point or an end point for data transmissions, and which can recognize, process and/or forward communications to other nodes. For example, Internet routers can look at an IP address prefix or the like identifying a device's network. Then, at a network level, routers can look at a set of bits identifying a particular subnet. Then, at a subnet level, routers can look at a set of bits identifying a particular device. With typical mobile IP communications, if a user disconnects a mobile device from the Internet and tries to reconnect it at a new subnet, then the device has to be reconfigured with a new IP address, a proper net mask and a default router. Otherwise, routing protocols would not be able to deliver the packets properly.

Figure 1C:
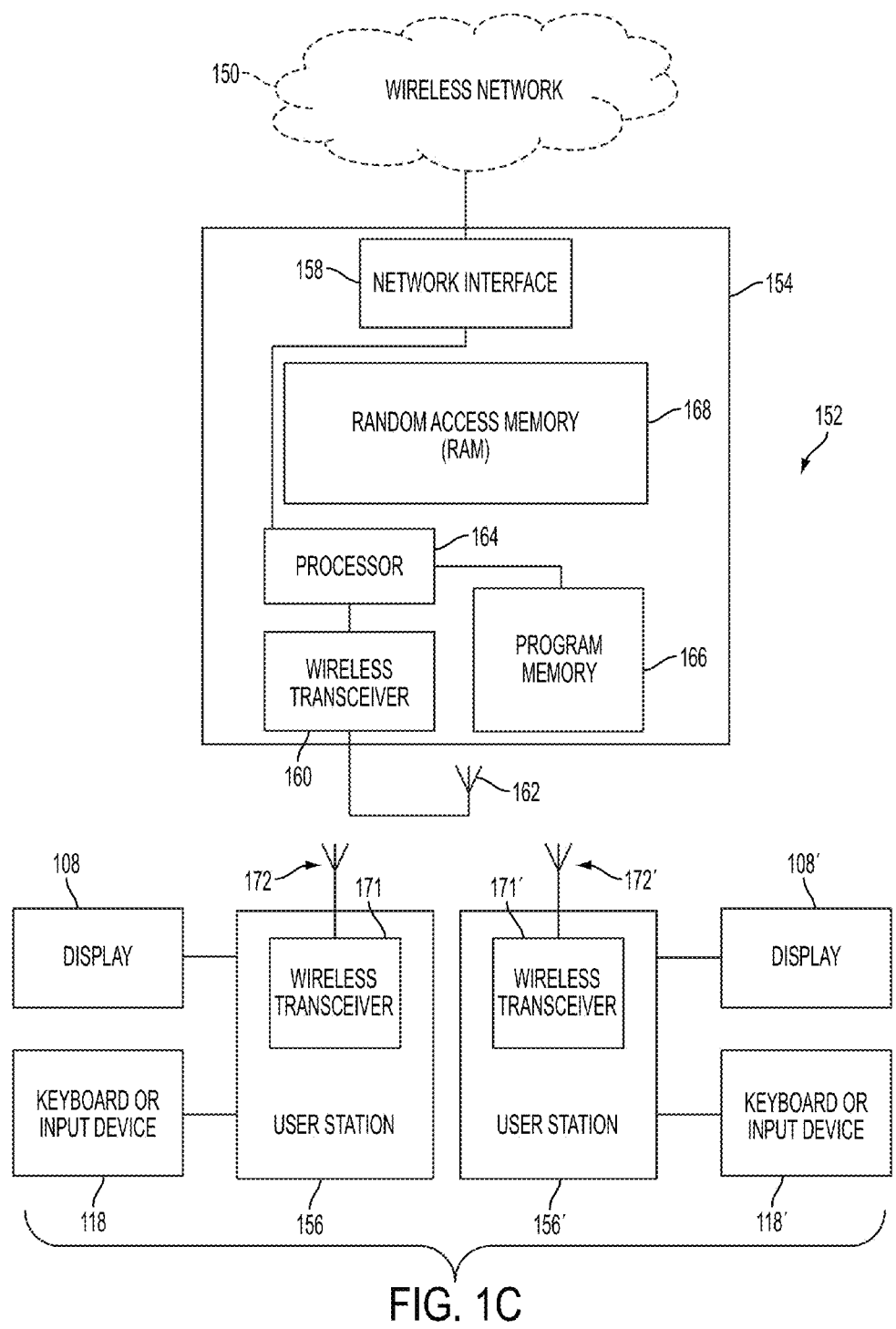
FIG. 1C is an illustrative architectural diagram showing some structure that can be employed by devices through which measuring human interaction is achieved.

FIG. 1c depicts components that can be employed in system configurations enabling the systems and technical effect of this invention, including wireless access points to which client devices communicate. In this regard, FIG. 1c shows a wireless network 150 connected to a wireless local area network (WLAN) 152. The WLAN 152 includes an access point (AP) 154 and a number of user stations 156, 156'. For example, the network 150 can include the Internet or a corporate data processing network. The access point 154 can be a wireless router, and the user stations 156, 156' can be portable computers, personal desk-top computers, PDAs, portable voice-over-IP telephones and/or other devices. The access point 154 has a network interface 158 linked to the network 150, and a wireless transceiver in communication with the user stations 156, 156'. For example, the wireless transceiver 160 can include an antenna 162 for radio or microwave frequency communication with the user stations 156, 156'. The access point 154 also has a processor 164, a program memory 166, and a random access memory 168. The user station 156 has a wireless transceiver 171 including an antenna 172 for communication with the access point station 154. In a similar fashion, the user station 156' has a wireless transceiver 171' and an antenna 172' for communication to the access point 154. By way of example, in some embodiments an authenticator could be employed within such an access point (AP) and/or a supplicant or peer could be employed within a mobile node or user station. Desktop display 108, 108' and key board 118, 118' or other input devices can also be provided with the user status.

Figure 1D:
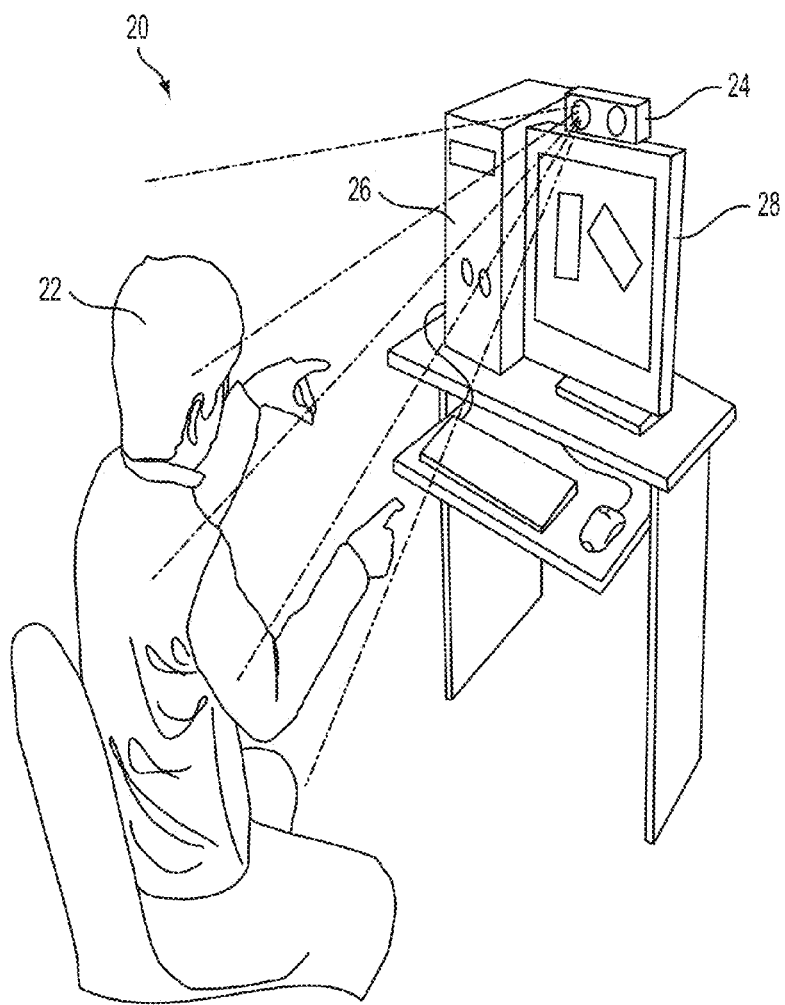
FIGS. 1D-H are illustrations of a system for 3D mapping, or 3D Scanner, through which measuring human interaction can be achieved.

FIG. 1D is a schematic, pictorial illustration of a system 20 for 3D mapping and imaging, suitable for use in implementing the disclosure. An imaging assembly 24 is configured to capture and process 3D maps and images of a user 22. This information may be used by a host computer 26 as part of a 3D user interface, which enables the user to interact with games and other applications running on the computer.

Imaging assembly 24 is configurable to project a pattern of optical radiation onto the body (or at least parts of the body) of user 22, and captures an image of the pattern that appears on the body surface. The optical radiation that is used for this purpose is typically in the infrared (IR) range. A processing device in assembly 24, then processes the image of the pattern in order to generate a depth map of the body, i.e., an array of 3D coordinates, comprising a depth (Z) coordinate value of the body surface at each point (X, Y) within a predefined area. (In the context of an array of image-related data, these (X, Y) points are also referred to as pixels.) The processing device computes the 3D coordinates of points on the surface of the user's body by triangulation, based on transverse shifts of the spots in the pattern. System 20 may implement other methods of 3D mapping, using single or multiple cameras or other types of sensors, as are known in the art.

Imaging assembly 24 is configurable to capture color (2D) images of the user and may also receive audio input. The imaging assembly registers and synchronizes the depth maps with the color images, and generates a data stream that includes the depth maps and image data (and possibly the audio data, as well) for output to computer 26. The depth maps, color images, and possibly the audio data are integrated into a single data stream, which is output to the computer via a single port, for example, a Universal Serial Bus (USB) port.

Computer 26 processes the data generated by assembly 24 in order to extract 3D image information. For example, the computer may segment the depth map in order to identify the parts of the body of user 22 and find their 3D locations. Computer 26 may use this information in driving an output device, such as a display 28, typically to present 3D image information and/or user interface elements that may be controlled by movements of parts of the user's body. Generally, computer 26 comprises a general-purpose computer processor, which is programmed in software to carry out these functions. The software may be downloaded to the processor in electronic form, over a network, for example, or it may alternatively be provided on tangible media, such as optical, magnetic, or electronic memory media.

Figure 1E:
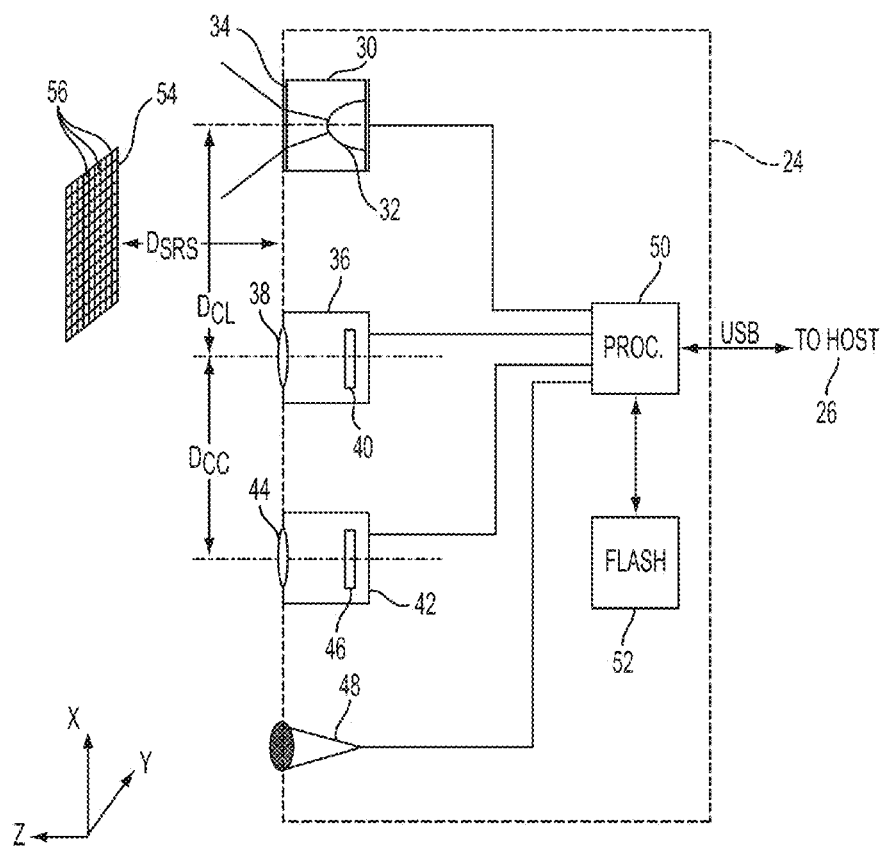

FIG. 1E is a schematic top view of a suitable imaging assembly 24 for use in implementing the disclosure. The X-axis is taken to be the horizontal direction along the front of assembly 24, the Y-axis is the vertical direction (into the page in this view), and the Z-axis extends away from assembly 24 in the general direction of the object being imaged by the assembly. For 3D mapping, an illumination subassembly 30 illuminates the object with an appropriate pattern, such as a speckle pattern. Subassembly 30 can comprise a suitable radiation source 32, such as a diode laser, LED or other light source, and optics, such as a diffuser 34 or a diffractive optical element, for creating the pattern. A depth image capture subassembly 36 captures an image of the pattern on the object surface. Subassembly 36 typically comprises objective optics 38, which image the object surface onto a detector 40, such as a CMOS image 3D scanner.

Radiation source 32 typically emits IR radiation, although other radiation bands, in the visible or ultraviolet range, for example, may also be used. Detector 40 may comprise a monochrome image sensor, without an IR-cutoff filter, in order to detect the image of the projected pattern with high sensitivity. To enhance the contrast of the image captured by detector 40, optics 38 or the detector itself may comprise a band pass filter, which passes the wavelength of radiation source 32 while blocking ambient radiation in other bands. A color image capture subassembly 42 captures color images of the object. Subassembly 42 typically comprises objective optics 44, which image the object surface onto a detector 46, such as a CMOS color mosaic image sensor. Optics 44 or detector 46 may comprise a filter, such as an IR-cutoff filter, so that the pattern projected by illumination subassembly 30 does not appear in the color images captured by detector 46.

A microphone 48 can also be provided to capture audio input, such as voice commands uttered by user 22.

A processing device 50 receives and processes image and audio inputs from subassemblies 36 and 42 and from microphone 48. Processing device 50 is configurable to compare the image provided by subassembly 36 to a reference image of the pattern projected by subassembly 30 onto a plane 54, at a known distance Dsrs from assembly 24. The processing device matches the local patterns in the captured image to those in the reference image and thus finds the transverse shift for each pixel 56, or group of pixels, within plane 54. Based on these transverse shifts and on the known distance Dcc between the optical axes of subassemblies 30 and 36, the processing device computes a depth (Z) coordinate for each pixel.

Processing device 50 synchronizes and registers the depth coordinates in each such 3D map with appropriate pixels in the color images captured by subassembly 42. The registration typically involves a shift of the coordinates associated with each depth value in the 3D map. The shift includes a static component, based on the known distance Dcc between the optical axes of subassemblies 36 and 42 and any misalignment between the detectors, as well as a dynamic component that is dependent on the depth coordinates themselves.

After registering the depth maps and color images, processing device 50 outputs the depth and color data via a port, such as a USB port, to host computer 26. The output data may be compressed in order to conserve bandwidth. Information provided by microphone 28 may also be synchronized and output together with the depth and color data to computer 26. The processor 50 may utilize flash memory 52, e.g., for temporary storage, before sending to the host computer 26.

Figure 1F:
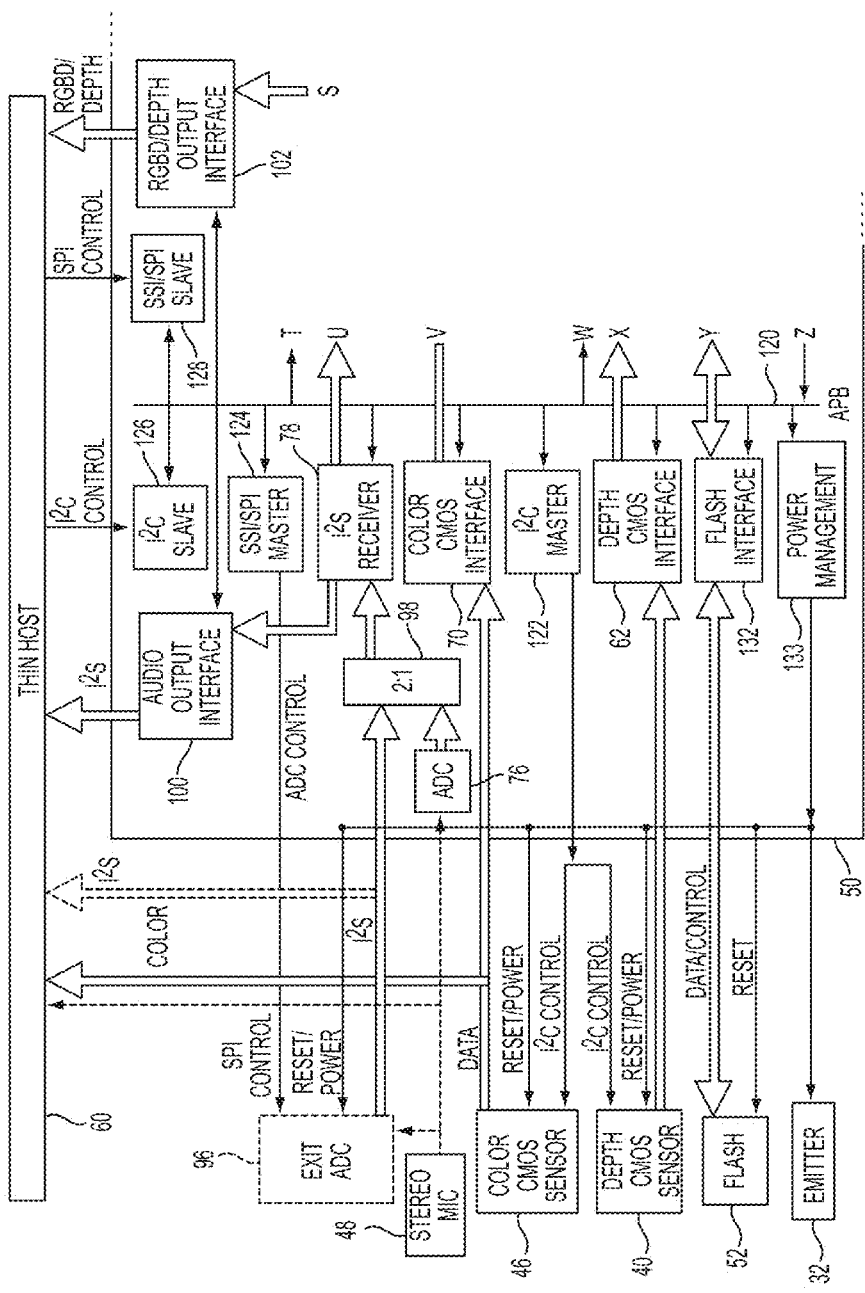
Figure 1G:
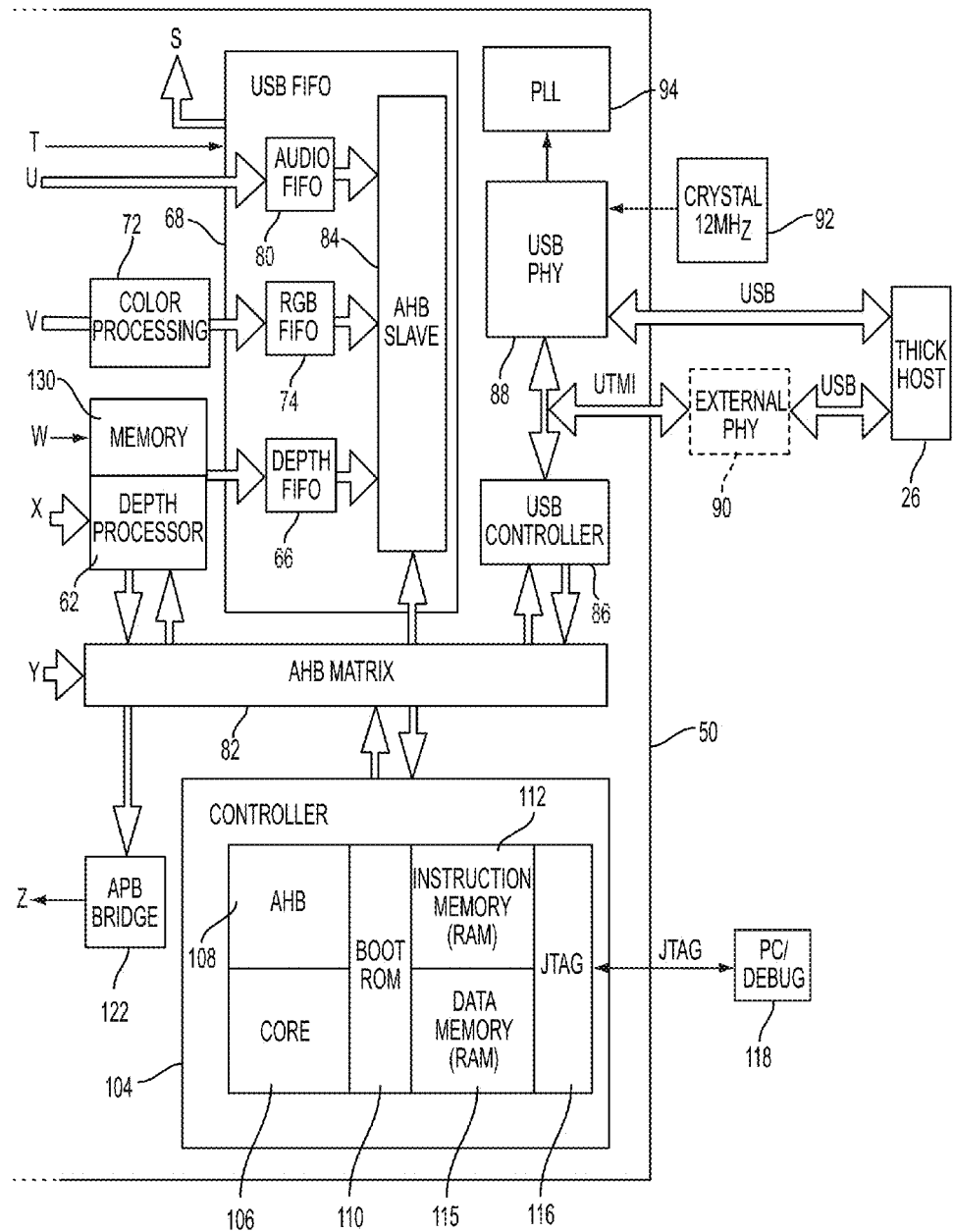

FIGS. 1F and G are block diagrams that schematically shows functional elements of processing device 50. Device 50 may be fabricated as a dedicated integrated circuit, on a single semiconductor substrate, with interfaces to the other components of assembly 24 of FIG. 1e and a USB port to host computer 26. This sort of implementation is useful in minimizing the cost, size and power consumption of assembly 24. Alternatively, device 50 may be implemented using a number of separate circuit components. Device 50 may include other interfaces, as well, including data and control interfaces to a "thin" host 60, such as a special-purpose multimedia application processor.

Device 50 can comprise the following components:

A depth processor 62 processes the information captured by depth image capture subassembly 36 in order to generate a depth map. Processor 62 uses dedicated memory space in a memory 130. This memory can also be accessed by a controller 104, but typically not by host computer 26. Rather, processor 62 may be programmed by the host computer via an application program interface (API).

Depth processor 62 receives input video data from detector 40 via a depth CMOS sensor interface 64. The depth processor 62 processes the video data in order to generate successive depth maps, i.e., frames of depth data. The depth processor 62 loads these data into a depth first-in-first-out (FIFO) memory 66 in a USB FIFO unit 68.

In parallel with the depth input and processing, a color processing block 72 receives input color video data from detector 46 via a color CMOS sensor interface 70. Block 72 converts the raw input data into output frames of RGB video data, and loads these data into a RGB FIFO memory 74 in unit 68. Alternatively, block 72 may output the video data in other formats, such as YUV or Bayer mosaic format.

In addition, audio signals from microphone 48 are digitized by an analog/digital converter (ADC) 76. The resulting digital audio samples are then conveyed by an audio interface 78 to an audio FIFO memory 80 in unit 68. In the example shown in FIG. 1F, interface 78 comprises an Integrated Interchip Sound (I2S) bus receiver.

USB FIFO unit 68 acts as a buffer level between the various data suppliers and a USB controller 86. Unit 68 packs and formats the various data types according to different classes (such as a USB video class and a USB audio class), and also serves to prevent data loss due to USB bandwidth glitches. It arranges the data into USB packets according to the USB protocol and format prior to transferring them to the USB controller.

A high-bandwidth bus, such as an Advanced High-performance Bus (AHB) matrix 82, is used to carry data between the components of device 50, and specifically for conveying data from USB FIFO unit 68 to USB controller 86 for transfer to host computer 26. When there are packets ready in FIFO unit 68 and space available in the internal memory of USB controller 86, the USB controller uses direct memory access (DMA) to read data from FIFO memories 66, 74 and 80 via an AHB slave module 84 and AHB matrix 82. The USB controller multiplexes the color, depth and audio data into a single data stream for output via USB interface to host computer 26.

For the purpose of USB communications, device 50 comprises a USB physical layer interface (PHY) 88, which may be operated by USB controller 86 to communicate via a suitable USB cable with a USB port of host computer 26. The timing of USB PHY 88 is controlled by a crystal oscillator 92 and a phase-locked loop (PLL) 94, as is known in the art. Alternatively, USB controller 86 may optionally communicate with the host computer via a USB 2.0 Transceiver Macrocell Interface (UTMI) and an external PHY 90.

An external ADC 96 may optionally be used to digitize the audio signals generated by microphone 48. A 2:1 switch 98 selects the source of digital audio data to be input to I2S receiver 78.

The I2S receiver may also output audio data directly to thin host 60 via an audio output interface 100, in case the thin host is not configured (in distinction to host computer 26) to receive the audio data together with the color and depth image data via a single serial bus. For some applications, interface 102 may output only the depth data to thin host 60.

Controller 104 is responsible for managing the functions of device 50, including boot-up and self-test, configuration, power and interface management, and parameter adjustment. The controller 104 comprises a digital signal processor (DSP) core 106 and an AHB master 108 for controlling data movement on AHB matrix 82. Typically, controller 104 boots from a boot read-only memory (ROM) 110, and then loads program code from flash memory 52 via a flash interface 132 into an instruction random-access memory (RAM) 124. The controller 104 also has its own data memory 115. Controller 104 may, in addition, have a test interface 116, such as a Joint Test Action Group (JTAG) interface, for purposes of debugging by an external computer 118.

Controller 104 distributes configuration data and parameters to other components of device 50 via a register configuration interface, such as an Advanced Peripheral Bus (APB) (not shown), to which the controller is connected through AHB matrix 82 and an APB bridge 122. Various control interfaces are available for controlling these other components, including a Serial Synchronous Interface (SSI) and Serial Peripheral Interface (SPI) master unit (not shown) and slave unit (not shown), as well as an Inter-Integrated Circuit (I2C) master unit (not shown) and slave unit (not shown). A power management interface (not shown) provides power and reset signals to the peripheral devices. These particular interfaces are shown here by way of example, and other interface configurations may alternatively be used for similar purposes.

Figure 1H:
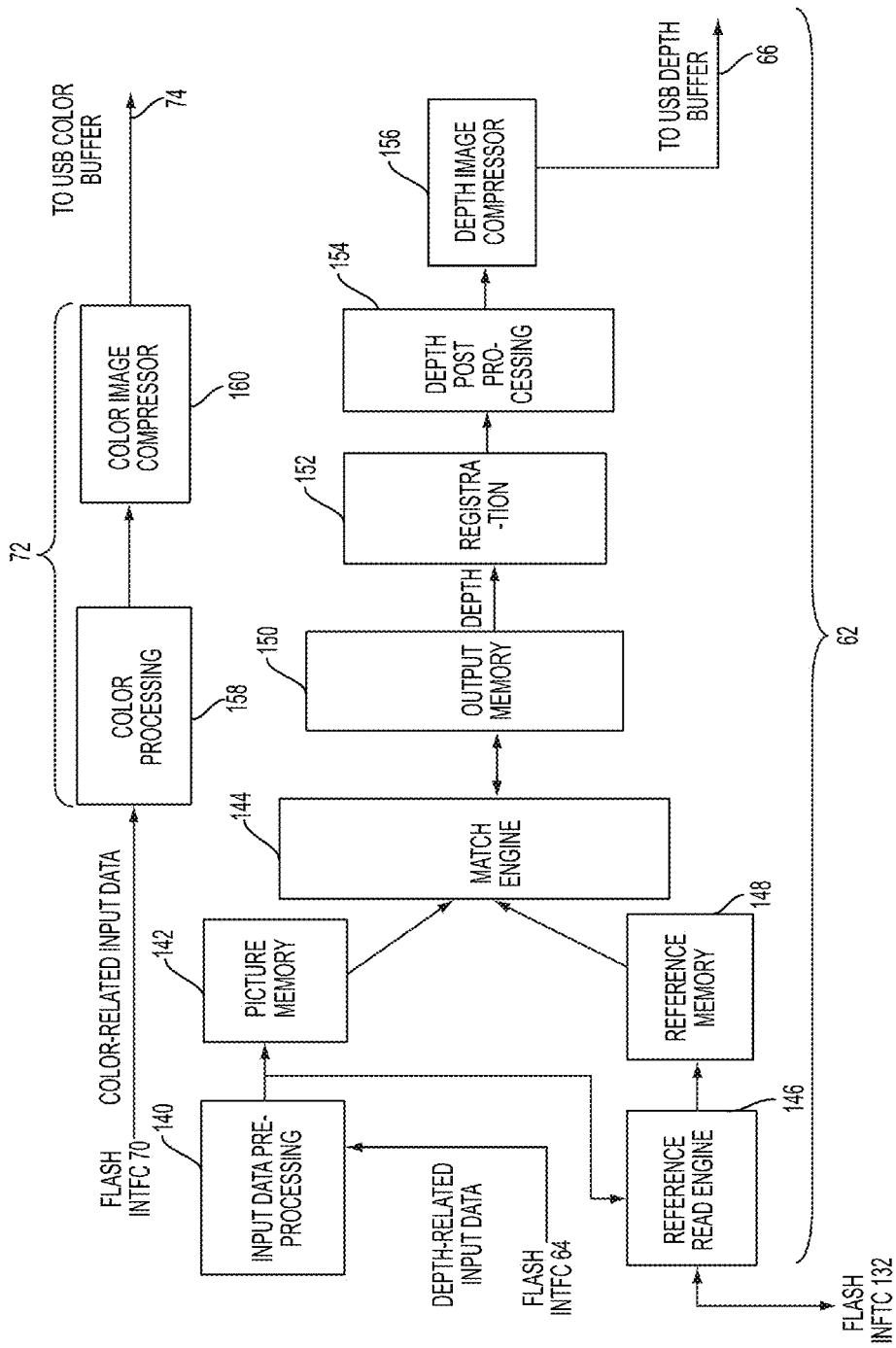

FIG. 1H is a block diagram that schematically shows details of depth processor 62, in accordance with an embodiment of the present invention. The figure also shows certain functions of the parallel color processing block 72.

To reduce on-chip storage and memory requirements, processor 62 typically uses a sliding window approach, in which only part of each processed image is stored in device 50 at any given time, and not the entire image. The window typically contains only a small number of lines of pixels. Newly-arrived data continually replaces old, processed data in the processor memory. The depth values are reconstructed by processor 62 on the fly, based on the input image data, and are output on the fly via FIFO buffer 66 to host computer 26.

An input data preprocessing block 140 in processor 62 accepts depth-related pixel values from detector 40 via interface 64 and performs filtering operations to reduce noise and possibly to classify the pixels into different groups. The preprocessed data within the current processing window are stored in a picture memory 142. The picture memory may comprise a number of memories or banks to allow simultaneous read of multiple data blocks.

For purposes of depth computation, a reference read engine 146 reads the reference image from memory 52 via interface 132 into a reference memory 148. The reference data are read from memory 52 synchronously with the arrival of the corresponding parts of the current image into memory 142 from preprocessing block 140. Like the picture memory, the reference memory stores only the part of the reference image that falls within the current processing window for the purpose of depth reconstruction, and may comprise a number of memories or banks Reference read engine 146 may also be controlled to store the reference image initially in memory 52 during the calibration procedure.

A match engine 144 matches groups of input pixels from memory 142 with corresponding groups of reference pixels from memory 148 in order to find the relative offset of the input pixels. The match engine translates this offset into a depth value, as explained above, and writes the depth value to an output memory 150. Again, at any given time, the output memory stores only a small sliding window out of the overall depth map, and may comprise a number of memories or banks.

A registration engine 152 registers the depth values generated by match engine 144 with color image data obtained from detector 46. Registration engine 152 shifts the locations of the depth values in the depth map to coincide with the appropriate color pixels in the color image. Alternatively, it would be possible to shift the color pixel values to coincide with the corresponding depth map pixels. Following registration, a depth post-processing block 154 applies filtering and possibly other mathematical operations to the depth data.

In parallel with the depth processing operations described above, a color image processor 158 in color processing block 72 converts input pixel values received from interface 70 into image data in accordance with an appropriate video standard, such as RGB or YUV, for example. A compression block 160, of similar design to block 156, compresses the color image data, as well.

IV. Media Independent Handover Services

In IEEE P802.21/D.01.09, September 2006, entitled Draft IEEE Standard for Local and Metropolitan Area Networks: Media Independent Handover Services, among other things, the document specifies 802 media access-independent mechanisms that optimize handovers between 802 systems and cellular systems. The IEEE 802.21 standard defines extensible media access independent mechanisms that enable the optimization of handovers between heterogeneous 802 systems and may facilitate handovers between 802 systems and cellular systems. "The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.)." See 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application. Other IEEE, or other such standards on protocols can be relied on as appropriate or desirable.

Figure 2:
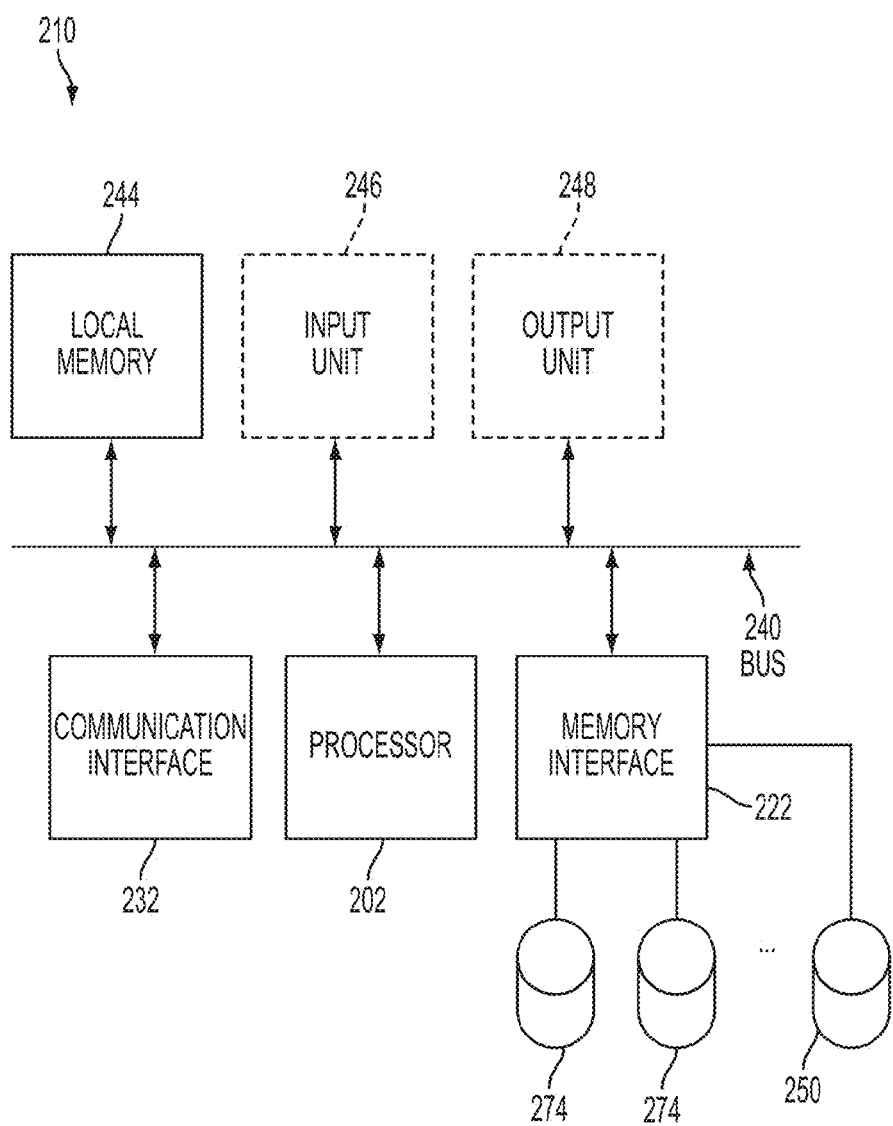
FIG. 2 is an exemplary diagram of a server in an implementation suitable for use in a system where measuring human interaction is achieved.

FIG. 2 is an exemplary diagram of a server 210 in an implementation consistent with the principles of the disclosure to achieve the desired technical effect and transformation. Server 210 may include a bus 240, a processor 202, a local memory 244, one or more optional input units 246, one or more optional output units 248, a communication interface 232, and a memory interface 222. Bus 240 may include one or more conductors that permit communication among the components of chunk server 250.

Processor 202 may include any type of conventional processor or microprocessor that interprets and executes instructions. Local memory 244 may include a random access memory (RAM) or another type of dynamic storage device that stores information and instructions for execution by processor 202 and/or a read only memory (ROM) or another type of static storage device that stores static information and instructions for use by processor 202.

Input unit 246 may include one or more conventional mechanisms that permit an operator to input information to a server 110, such as a keyboard 118, a mouse 120 (shown in FIG. 1), a pen, voice recognition and/or biometric mechanisms, etc. Output unit 248 may include one or more conventional mechanisms that output information to the operator, such as a display 134, a printer 130 (shown in FIG. 1), a speaker, etc. Communication interface 232 may include any transceiver-like mechanism that enables chunk server 250 to communicate with other devices and/or systems. For example, communication interface 232 may include mechanisms for communicating with master and clients.

Memory interface 222 may include a memory controller 122 (FIG. 2). Memory interface 222 may connect to one or more memory devices, such as one or more local disks 274, and control the reading and writing of chunk data to/from local disks 274 or from database 250. Memory interface 222 may access chunk data using a chunk handle and a byte range within that chunk.

Figure 3:
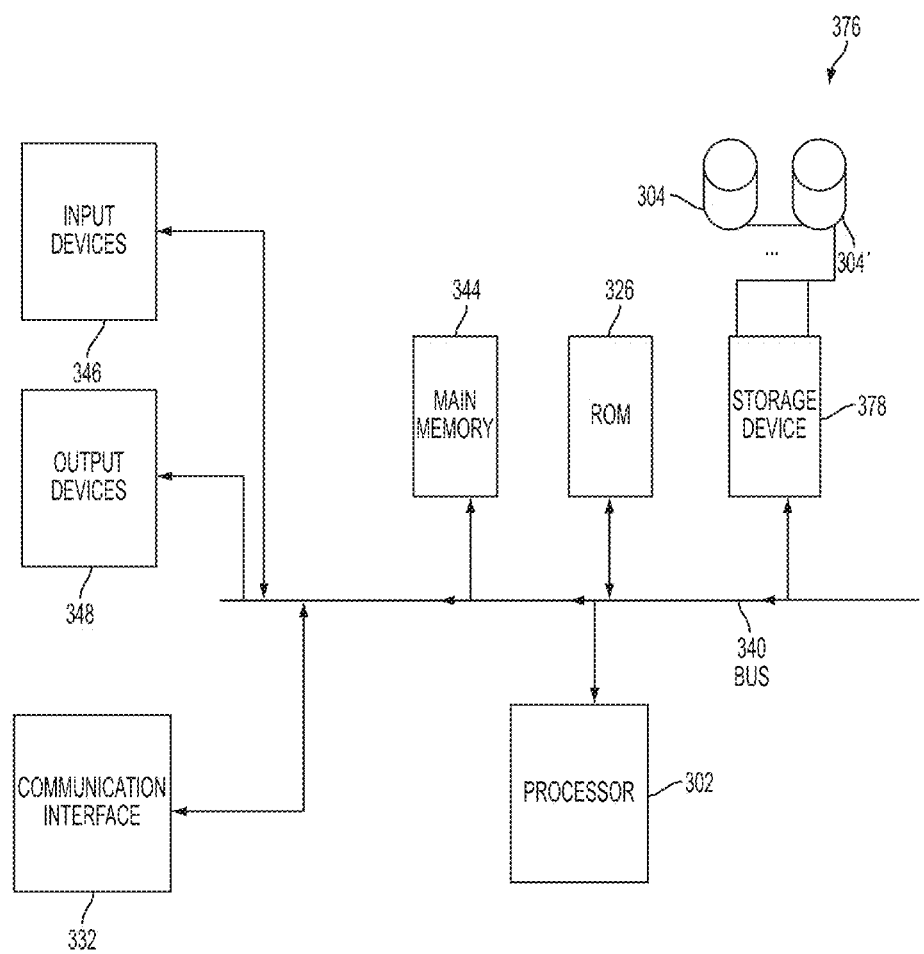
FIG. 3 is an exemplary diagram of a master system in an implementation suitable for use in a system where measuring human interaction is achieved.

FIG. 3 is an exemplary diagram of a master system 376 suitable for use in an implementation consistent with the principles of the disclosure to achieve the desired technical effect and transformation. Master system 376 may include a bus 340, a processor 302, a main memory 344, a ROM 326, a storage device 378, one or more input devices 346, one or more output devices 348, and a communication interface 332. Bus 340 may include one or more conductors that permit communication among the components of master system 376.

Processor 302 may include any type of conventional processor or microprocessor that interprets and executes instructions. Main memory 344 may include a RAM or another type of dynamic storage device that stores information and instructions for execution by processor 302. ROM 326 may include a conventional ROM device or another type of static storage device that stores static information and instructions for use by processor 302. Storage device 378 may include a magnetic and/or optical recording medium and its corresponding drive. For example, storage device 378 may include one or more local disks 304, 304' that provide persistent storage.

Input devices 346 used to achieve the desired technical effect and transformation may include one or more conventional mechanisms that permit an operator to input information to the master system 374, such as a keyboard 118, a mouse 120, (shown in FIG. 1) a pen, voice recognition and/or biometric mechanisms, etc. Output devices 348 may include one or more conventional mechanisms that output information to the operator, including a display 108, a printer 142 (shown in FIG. 1), a speaker, etc. Communication interface 332 may include any transceiver-like mechanism that enables master system 376 to communicate with other devices and/or systems. For example, communication interface 332 may include mechanisms for communicating with servers and clients as shown above.

Master system 376 used to achieve the desired technical effect and transformation may maintain file system metadata within one or more computer readable mediums, such as main memory 344 and/or storage device.

The computer implemented system provides a storage and delivery base which allows users to exchange services and information openly on the Internet used to achieve the desired technical effect and transformation. A user will be enabled to operate as both a consumer and producer of any and all digital content or information through one or more master system servers.

A user executes a browser to view digital content items and can connect to the front end server via a network, which is typically the Internet, but can also be any network, including but not limited to any combination of a LAN, a MAN, a WAN, a mobile, wired or wireless network, a private network, or a virtual private network. As will be understood a very large numbers (e.g., millions) of users are supported and can be in communication with the website at any time. The user may include a variety of different computing devices. Examples of user devices include, but are not limited to, personal computers, digital assistants, personal digital assistants, cellular phones, mobile phones, smart phones or laptop computers.

The browser can include any application that allows users to access web pages on the World Wide Web. Suitable applications include, but are not limited to, Microsoft Internet Explorer®, Netscape Navigator®, Mozilla® Firefox, Apple® Safari or any application adapted to allow access to web pages on the World Wide Web. The browser can also include a video player (e.g., Flash™ from Adobe Systems, Inc.), or any other player adapted for the video file formats used in the video hosting website. Alternatively, videos can be accessed by a standalone program separate from the browser. A user can access a video from the website by, for example, browsing a catalog of digital content, conducting searches on keywords, reviewing aggregate lists from other users or the system administrator (e.g., collections of videos forming channels), or viewing digital content associated with particular user groups (e.g., communities).

V. Computer Network Environment

Figure 4:
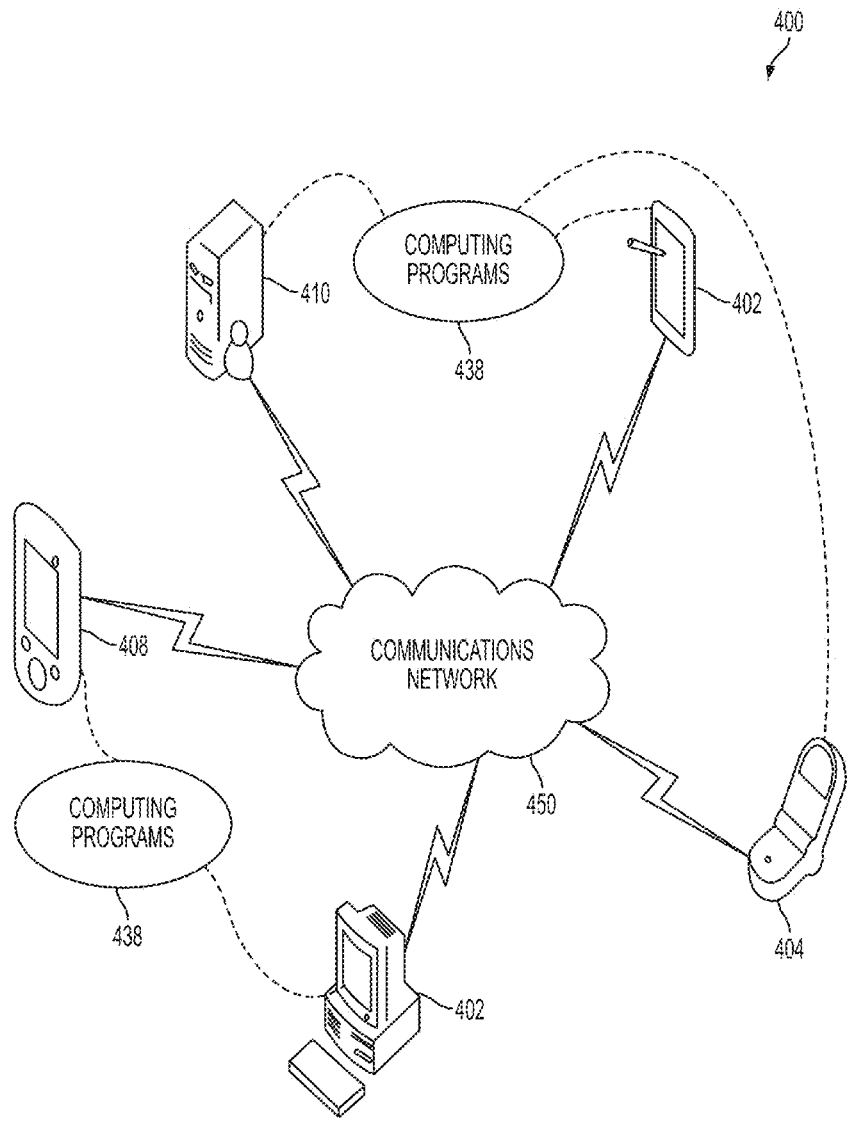
FIG. 4 is a block diagram showing the cooperation of exemplary components of a system suitable for use in a system where measuring human interaction is achieved.

Computing system 100, described above, can be deployed as part of a computer network used to achieve the desired technical effect and transformation. In general, the above description for computing environments applies to both server computers and client computers deployed in a network environment. FIG. 4 illustrates an exemplary illustrative networked computing environment 400, with a server 410 in communication with client computers via a communications network 450. As shown in FIG. 4, server 410 may be interconnected via a communications network 450 (which may be either of, or a combination of a fixed-wire or wireless LAN, WAN, intranet, extranet, peer-to-peer network, virtual private network, the Internet, or other communications network) with a number of client computing environments such as tablet personal computer 402, mobile telephone, smart phone 404, personal computer 402, and personal digital assistant 408. In a network environment in which the communications network 450 is the Internet, for example, server 410 can be a plurality of dedicated computing environment servers operable to process and communicate data to and from client computing environments via any of a number of known protocols, such as, hypertext transfer protocol (HTTP), file transfer protocol (FTP), simple object access protocol (SOAP), or wireless application protocol (WAP). Other wireless protocols can be used without departing from the scope of the disclosure, including, for example Wireless Markup Language (WML), DoCoMo i-mode (used, for example, in Japan) and XHTML Basic. Additionally, networked computing environment 400 can utilize various data security protocols such as secured socket layer (SSL) or pretty good privacy (PGP). Each client computing environment can be equipped with operating system 438 operable to support one or more computing applications, such as a web browser (not shown), or other graphical user interface (not shown), or a mobile desktop environment (not shown) to gain access to server computing environment 400.

In operation, a user (not shown) may interact with a computing application running on a client computing environment to obtain desired data and/or computing applications. The data and/or computing applications may be stored on server computing environment 400 and communicated to cooperating users through client computing environments over exemplary communications network 450. The computing applications, described in more detail below, are used to achieve the desired technical effect and transformation set forth. A participating user may request access to specific data and applications housed in whole or in part on server computing environment 400. These data may be communicated between client computing environments and server computing environments for processing and storage. Server computing environment 400 may host computing applications, processes and applets for the generation, authentication, encryption, and communication data and applications and may cooperate with other server computing environments (not shown), third party service providers (not shown), network attached storage (NAS) and storage area networks (SAN) to realize application/data transactions.

VI. Media Independent Information Service

The Media Independent Information Service (MIIS) provides a framework and corresponding mechanisms by which an MIHF entity may discover and obtain network information existing within a geographical area to facilitate handovers. Additionally or alternatively, neighboring network information discovered and obtained by this framework and mechanisms can also be used in conjunction with user and network operator policies for optimum initial network selection and access (attachment), or network re-selection in idle mode.

MIIS primarily provides a set of information elements (IEs), the information structure and its representation, and a query/response type of mechanism for information transfer. The information can be present in some information server from which, e.g., an MIHF in the Mobile Node (MN) can access it.

Depending on the type of mobility, support for different types of information elements may be necessary for performing handovers. MIIS provides the capability for obtaining information about lower layers such as neighbor maps and other link layer parameters, as well as information about available higher layer services such as Internet connectivity.

MIIS provides a generic mechanism to allow a service provider and a mobile user to exchange information on different handover candidate access networks. The handover candidate information can include different access technologies such as IEEE 802 networks, 3GPP networks and 3GPP2 networks. The MIIS also allows this collective information to be accessed from any single network. For example, by using an IEEE 802.11 access network, it can be possible to get information not only about all other IEEE 802 based networks in a particular region but also about 3GPP and 3GPP2 networks. Similarly, using, e.g., a 3GPP2 interface, it can be possible to get access to information about all IEEE 802 and 3GPP networks in a given region. This capability allows the MN to use its currently active access network and inquire about other available access networks in a geographical region. Thus, a MN is freed from the burden of powering up each of its individual radios and establishing network connectivity for the purpose of retrieving heterogeneous network information. MIIS enables this functionality across all available access networks by providing a uniform way to retrieve heterogeneous network information in any geographical area.

Figure 5A:
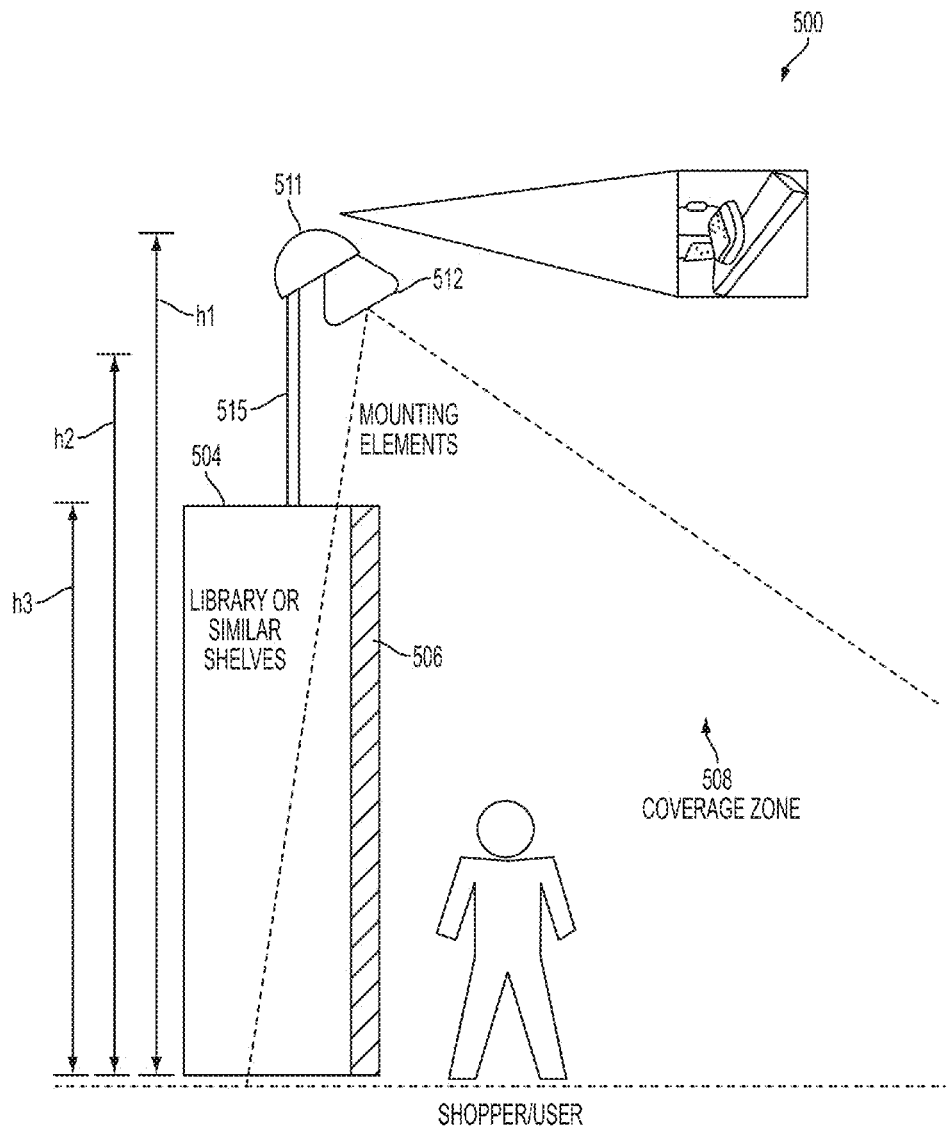
FIG. 5A illustrates a mounted 3D scanner and coverage zone in a first orientation deployed according to the system.

VII. Software Programs Implementable in the Computing and Network Environments to Achieve a Desired Technical Effect or Transformation FIG. 5A illustrates, schematically, a mounted device 511 and coverage zone 508 in a first orientation deployed according to the system to capture information in the coverage zone 508 to be covered. As illustrated in FIG. 5A a system 500 whereby a device having a 3D scanner 512, by way of example only, a "Kinect" device, which could be another type of 3D scanner, is mounted a distance of between h1 and h2 from a floor using, for example, a mounting element 515. Mounting of the device 511 allows the system to be configured to identify a coverage zone 508, which can be, e.g., a shopper tracking area in which a monitorable element (such as a person) would be positioned. Within the coverage zone 508, an engagement zone 506, which can be a shelf tracking area, which may be three dimensional, is identified with respect to a particular object 504, such as actual shelves. As illustrated here, the engagement zone 506 is positioned relative to a physical space, such as shelves, having a height h3. The height of the mounting device 515 is less than the height of the device 511. Moreover, the definable engagement zone 506 has at least two dimensions defined, the height of which can be the same as the object 504 or less than the object 504. In the event that a single 3D scanner 512 does not provide enough sensing capability for covering the engagement zone area 506 to be studied, several overlapping coverage zones 508 can be positioned next to each other until the full area of interest is visible by at least one 3D scanner 512, as is shown by way of Example in FIGS. 5C-D, wherein FIG. 5C also includes exemplar sizes. FIGS. 5C-D include a plurality of devices 511, and scanners 512 which are mounted on associated mounting elements 515. For purposes of illustration, three devices are illustrated. However, as will be appreciated by those skilled in the art, more or fewer devices can be deployed. The individual scanners 512 in FIG. 5C can also cover coverage zones 508*a*, 508*b*, 508*c*, respectively, covering, for example shelve areas 504*a*, 504*b*, 504*c*. As shown in FIG. 5D, the plurality of engagement zones 506*a*, 506*b*, 506*c*, also include a plurality of checkpoint zones 520*a*, 520*b*.

Where multiple 3D scanners 512 are employed, the devices 511 can further be configurable to communicate with each other locally in real-time (e.g.: over a local network) and a synchronization mechanism that informs each 3D scanner 512 the unique ID assigned to the person based on the location of that person at a particular point in time, as well as with a central (remote) device. As will be appreciated by those skilled in the art, synchronization can be calculated afterwards when the data from all coverage zones 508 is analyzed together. Persons occupying the approximate same location at approximately the same time as captured by two or more 3D scanners 512 are identified with the same unique ID.

Once the 3D scanner 512 is in place and the software is active, the configuration of the three dimensional engagement zones 506 of interest can be performed. This configuration can comprise manual, assisted and/or completely automated steps. Manual steps of configuration involve, for example, determining the location and size of different coverage zones 508 (places where people can be physically) and engagement zones 506 (places where people can interact, like touching, moving or grabbing).

Figure 5B:
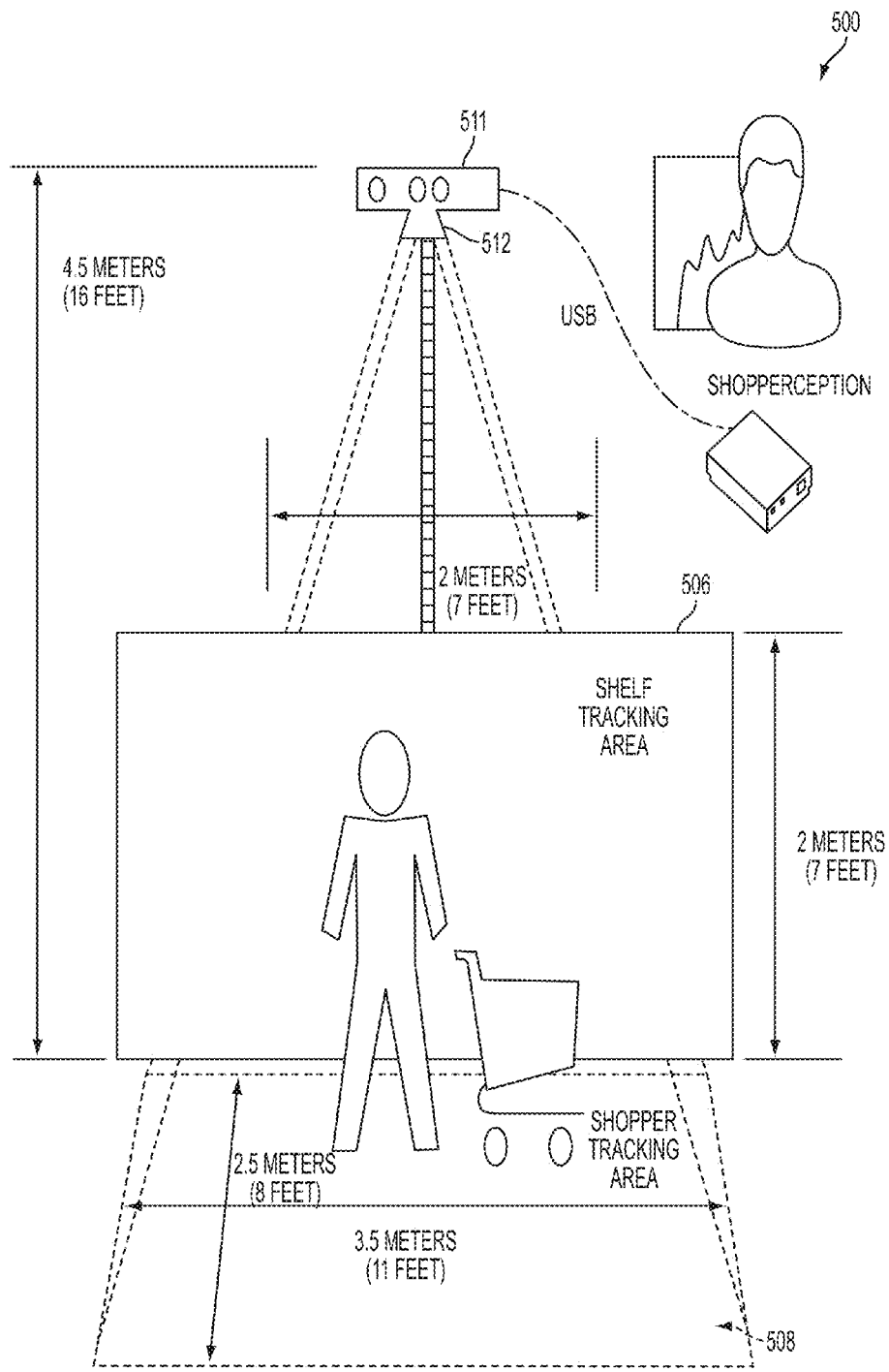
FIG. 5B illustrates a mounted device and coverage zone in a second orientation deployed according to the system.
Figure 5C:
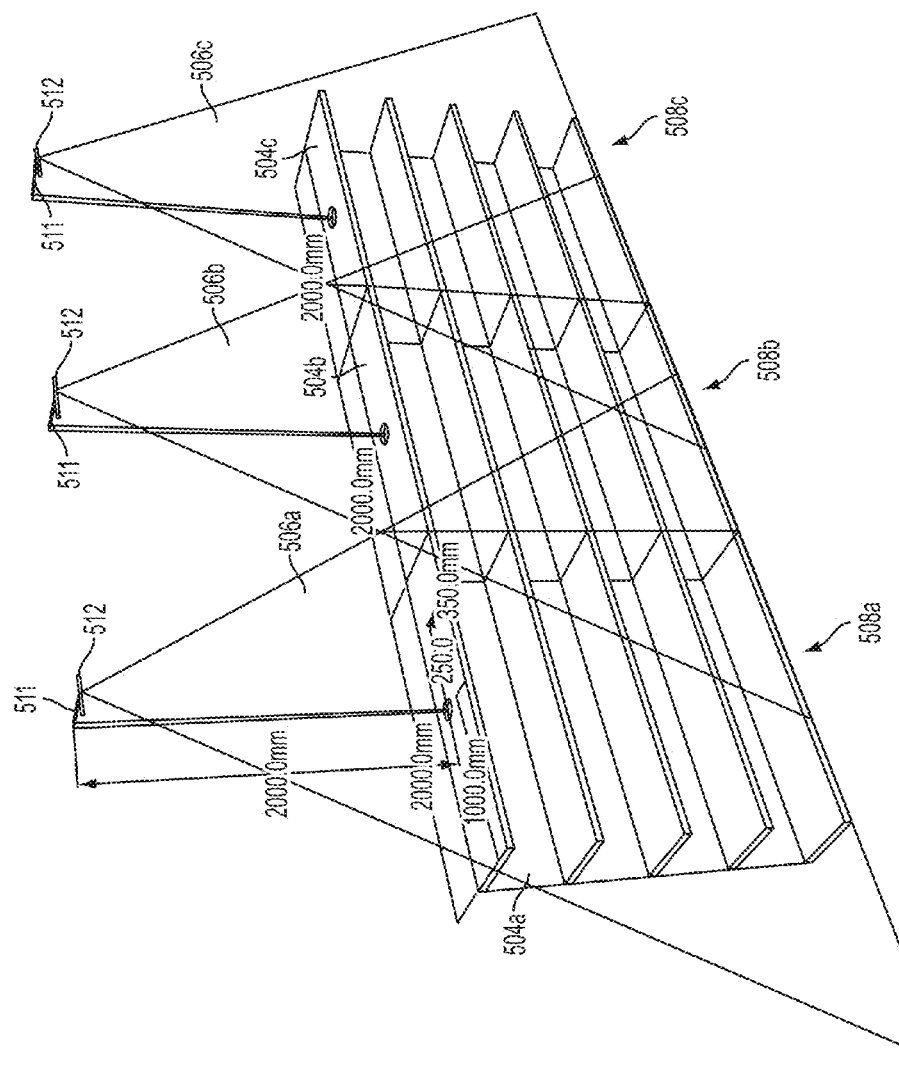
FIG. 5C-D illustrate, by way of example, multiple 3D scanners covering adjacent coverage zones.
Figure 5D:
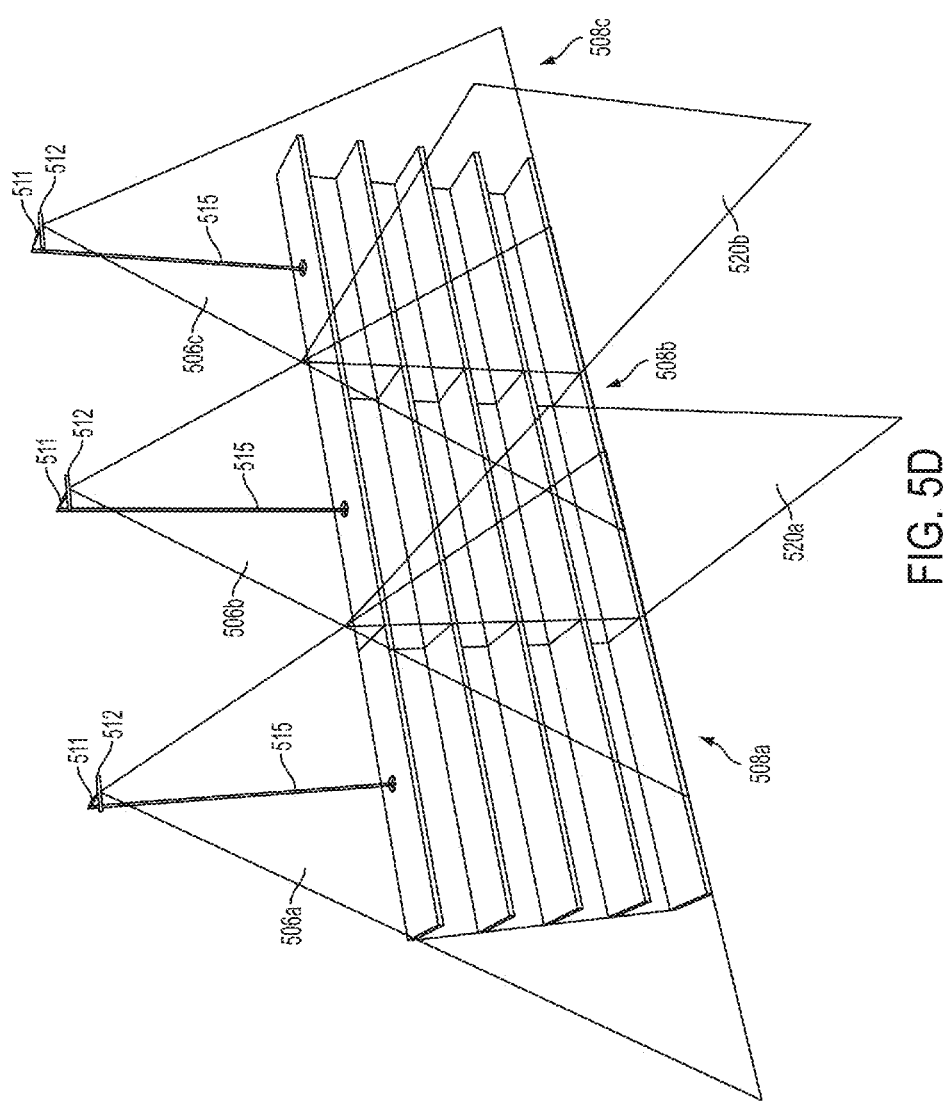

FIG. 5B illustrates the system 500, schematically, a mounted device 511 and coverage zone 508 in a second orientation, perpendicular to the orientation illustrated in FIG. 5A, deployed according to the system. The coverage zone 508 is any suitable area for achieving the objectives disclosed. As illustrated, the coverage zone 508 is less than the total area for the shelves. For example, an engagement zone 506 could have the same height and width, such as 2.0 meters high and 2.0 meters wide, and comprise a subset of the entire coverage zone 508 which could be, for example, 7 feet high and 7 feet wide (as illustrated), while capturing a person standing within the coverage zone 508 which could be 8 feet wide in a first direction and 11 feet wide in a second direction at a floor bounding the bottom of the coverage zone 508.

The geometric shapes and sizes of the engagement zone 506 and the coverage zone 508 can change, as desired or contemplated by the sensitivity of the tracking components without departing from the scope of the disclosure.

Figure 6A:
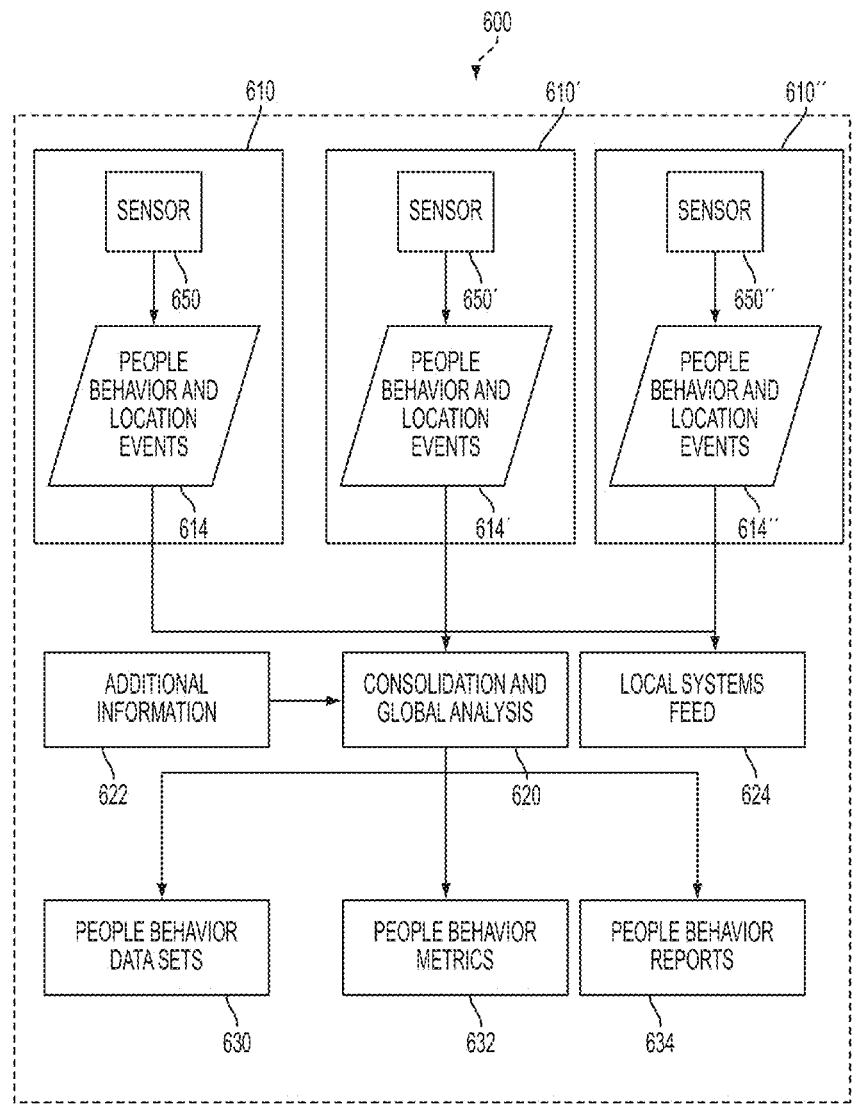
FIGS. 6A-F are flow diagrams showing operations of the system.

FIGS. 6A-F are flow diagrams showing operations of the system. FIG. 6A illustrates the method overview 600 wherein behavior and location events contain information about each time a person was detected and identified with a unique ID for the whole duration of their tracking Multiple collection points 610, 610', 610", are provided, each of which have one or more 3D scanners 650, 650', 650", adaptable and configurable to sense and/or analyze people's behavior and/or location events 614, 614', 614". The information from the one or more 3D scanners 610, 610', 610" are provided to a consolidation and global analysis system 620 and may also be provided to a local systems feed 624. Additional information 622, as discussed below, may also be provided to the consolidation and global analysis system 620. The output of the consolidation and global analysis system 620 can be, for example, people behavior data sets 630, people behavior metrics 632, and/or people behavior reports 634.

Visual characteristics of a person can be recorded digitally in order to facilitate identifying a returning person with the same ID, as is well known in the art, as exemplified by U.S. Pat. No. 6,711,293, issued to Lowe on Mar. 23, 2004, entitled Method And Apparatus For Identifying Scale Invariant Features In An Image And Use Of Same For Locating An Object In An Image, referenced above. As will be appreciated by those skilled in the art, visual characteristics need not be recorded for all implementations. Under other embodiments, the ID is provided by the person willingly through for example some sort of loyalty card, or external systems, such as smartphone applications or QR code scanning. Behavior and location events 614 recorded with a person's assigned ID can be correlated with the times and interactions with the configured elements in the environment, for example but not limited to, entering or leaving a certain area, touching an object and the exact 3D coordinates of such a touch, or interactions with other tracked objects, like pulling a shopping cart or picking up an object and leaving it in other location. Under some aspects of the solution, this information contains pictures of the relevant moments in the person's interaction, like grabbing a product or entering a zone.

Local systems feed 624 facilitate providing Behavior and Location Events to an external system. As a result of the interaction an advertising display can be dynamically altered to react to a visitor's actions, a coupon printer or other tracking or loyalty systems using this information for statistical or real-time reactions purposes. Under other embodiments of the disclosure the People Behavior and Events 614 information is sent to a local or remotely located Consolidation and Global Analysis System 620, which is configurable to process information for understanding behavior in time (e.g., the person entered here and then touched this element) and location (e.g.: the same person that touched this in one engagement zone, touched that in another engagement zone, each of which, it will be understood, could be in different coverage zones, each for a respective 3D scanner. The system thus can classify people's behavior into behavior sets 630 in order to discard people that are not behaving under the objectives of the current study. For example, store employees behavior can be discarded; selected customers can be kept based on their clothing or their behavior.

The Behavior and Location Events information is also enriched with other Additional Information 622 that either is a part of the Consolidation and Global Analysis System 620 (e.g.: product exact locations in shelves based on planograms, other similar studies and statistics for comparison) or external systems (results from a Business Intelligence System, an ERP with price lists, weather information for the moment of the study, etc.). With the results of this processing and enrichment, the system provides several results:

People Behavior Metrics 632: grouped and comparable values that allow insights and actions, like the amount of visits, the percentage of touches of a certain product, the average time visitors stay in a particular place or compound indexes of other metrics that allow comparing performance, for example, a mixture of the average time to pick-up, amount of returns and square meters of shelf for a certain product that can provide an indication of how well that product performs in different stores in the country.

People Behavior Data Sets 630: enriched exports and automated access of the People Behavior and Location Events 614 in order to feed external systems like Databases, Business Intelligence Systems or Data Mining tools.

People Behavior Reports 634: graphs and interactive charts based on the Metrics 632 or Data Sets 630 that an analyst or business person can see in order to get conclusions. For example, heat maps showing the areas with more physical interaction, transit paths, shopper stories told through a sequence of pictures, relationships between different objects based on behavior (e.g.: 34% of the people that touched this element had before touched this other element).

Figure 6B:
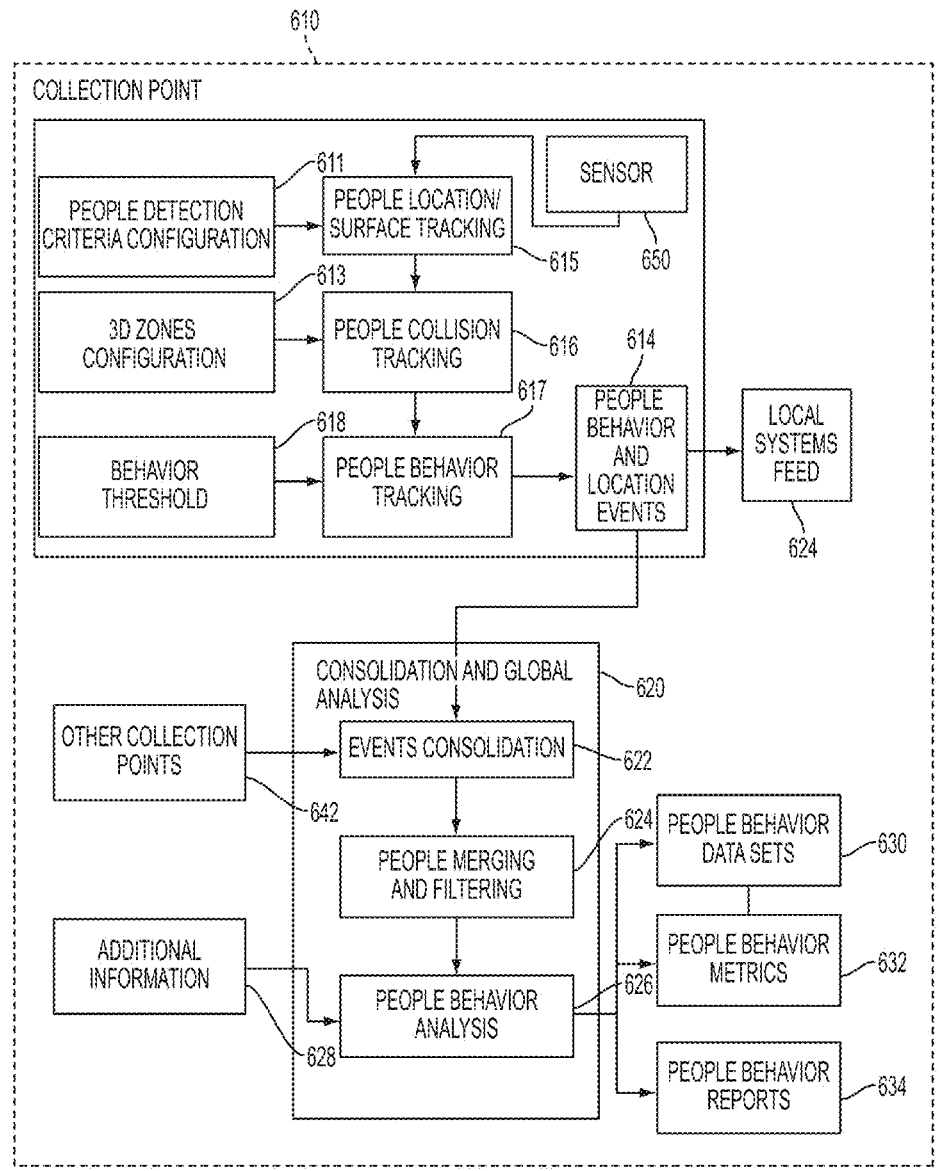

FIG. 6B illustrates the collection point 610 of FIG. 6A, wherein the collection point 610 comprises the aforementioned physical 3D scanner 650 recording for sending data for a processing unit. The 3D scanner 650 facilitates people location/surface tracking 615, people collision tracking 616, people behavior tracking 617, which results in people behavior and location events 614 which can then be fed to a local systems feed 624 and/or a consolidation and global analysis system 620. People location/surface tracking 615, can be configurable to use people detection criteria 611. Similarly, the people collision tracking 616 can be configurable to use zone configuration 613, such as 3D zone configuration. Moreover, people behavior tracking 617 can be configurable to take into account one or more behavior thresholds 618.

Consolidation and global analysis system 620 can analyze event consolidation 622, people merging and filtering 624, and people behavior analysis 626. Event consolidation 622 can be further developed to take into consideration data and information from other collection points 642. People behavior analysis 626 is also configurable to take into consideration additional information 628. The system 620 may receive input from other collection points 642. The system 620, then generates, for example, people behavior data sets 630, people behavior metrics 632, and/or people behavior reports 634, as shown in.

As will be appreciated by those skilled in the art, logic apparatuses or processing units are adaptable and configurable to read instructions from media that is configurable to provide the following components:

People Location and Surface Tracking 615: translates the 3D scanner 650 sequential readings into a 3D representation of the people and their detected surface, that is, their external volume, or Point Cloud, in relation to known places, like for example the floor. This tracking is performed according to configuration parameters that can be either entered manually or configured automatically when the appropriate hardware 3D scanner 650 is available, for example, an accelerometer to determine the direction of the floor, or the height of a shopping cart that should not be tracked.

Figure 6C:
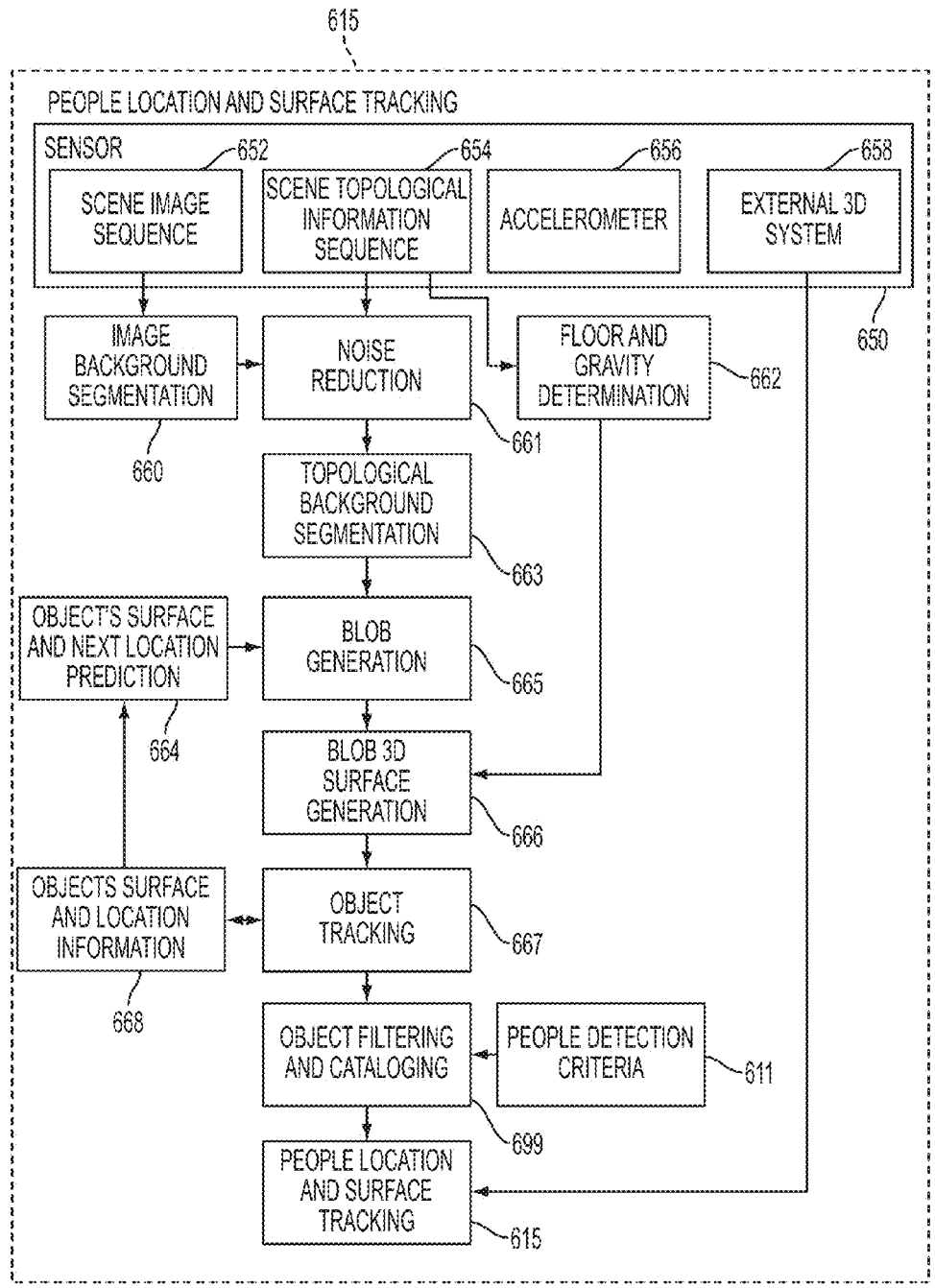

FIG. 6c illustrates additional detail of the people location and surface tracking 615. 3D scanner 650 is configurable to include a point cloud sequence component 652, a scene topological information sequence component 654, an accelerometer 656 and/or external 3D system 658. The scene image sequence component 652, e.g., a point cloud, is configurable to provide image, e.g., a point cloud, background segmentation 660, while the scene topological information sequence component 654 is configurable to provide noise reduction 661 and/or floor and gravity determination 662. Noise reduction 661 can also take into account information from the point cloud background segmentation 660. From the noise reduction 661, topological background segmentation 663 can be generated, which in turn can lead to "blob" generation 665, from which 3D surface generation 666 occurs. The blob generation 665 can further be in a feedback loop with an object tracking component 667 to provide object surface and location information 668, as well as object surface and next location prediction 664. The blob 3D surface generation 666 can also factor in information from floor and gravity determination 662. Object tracking 667, which receives input from the blob 3D surface generation 666 and floor and gravity determination 662, while being in a feedback loop with blob generation 665, produces an object filtering and cataloging 699 output which communicates with and receives information from people detection criteria 61. Additionally, People location and surface tracking 615 is configurable to receive input from the object filtering and cataloging output 699 as well as from external 3D system 658.

The Topological Background Segmentation module 663 is configurable to separate information belonging to the background (static scene object) with the foreground (moving objects like shopping carts, baby strollers and people). This information can be used to generate "blobs" in modules 665 and 666, which are 3D areas of continuity and can be stored as a subset of the full scene's point cloud, that can later be used to determine candidate object's locations, surface and limits with other objects.

Object's surface and next location prediction 664: utilizing the last known information on an object's surface and location 668 and other attributes like speed and direction, e.g., received from the object tracking module 667, a prediction is generated in module 664 as to where objects are "supposed" to be found. This prediction process helps the blob generation algorithms define boundaries in objects in modules 665 and 666. This information also is useful when for example two separate objects merge (like people engaging in physical contact) so they can still be differentiated even when they are now contiguous.

Blob 3D surface generation 666 is also configurable to use information like the gravity's acceleration vector and the floor to determine the blob's surface 3D position and the object's height. This information can then be used together with the previous known Object Surface and Location Information 668 in order to determine which objects detected now are the same objects that were being tracked in the previous frame of information obtained from the 3D scanner. New objects that don't match are created, old objects that left the detection zone are marked as "disappeared" for some time before being erased (in case they show up again because they were occluded by other objects) and objects that match in approximate size and position are updated with their new surface and position. This process may be the responsibility of the Object Tracking algorithms used in module 667.

Object filtering and cataloguing 699 can be responsible for discarding objects that do not meet the People Detection Criteria 611. This can be for example a certain minimum height (used to discard shopping carts), or a threshold for maximum and minimum volumes (for objects like repositioning carts), or some colors or tags (for employees). Objects keep a history on meeting these criteria, since for example a person can crouch in order to grab something and not meet temporarily the height criteria, but should still be cataloged as a person.

The result of this process is a set of people with their location and their 3D surface information, as definable using the point cloud, together with other characterization data such as height, segmentation of body parts, clothing colors or other digitalized signature that could help identifying them again during the same visit to the public space.

Figure 6D:
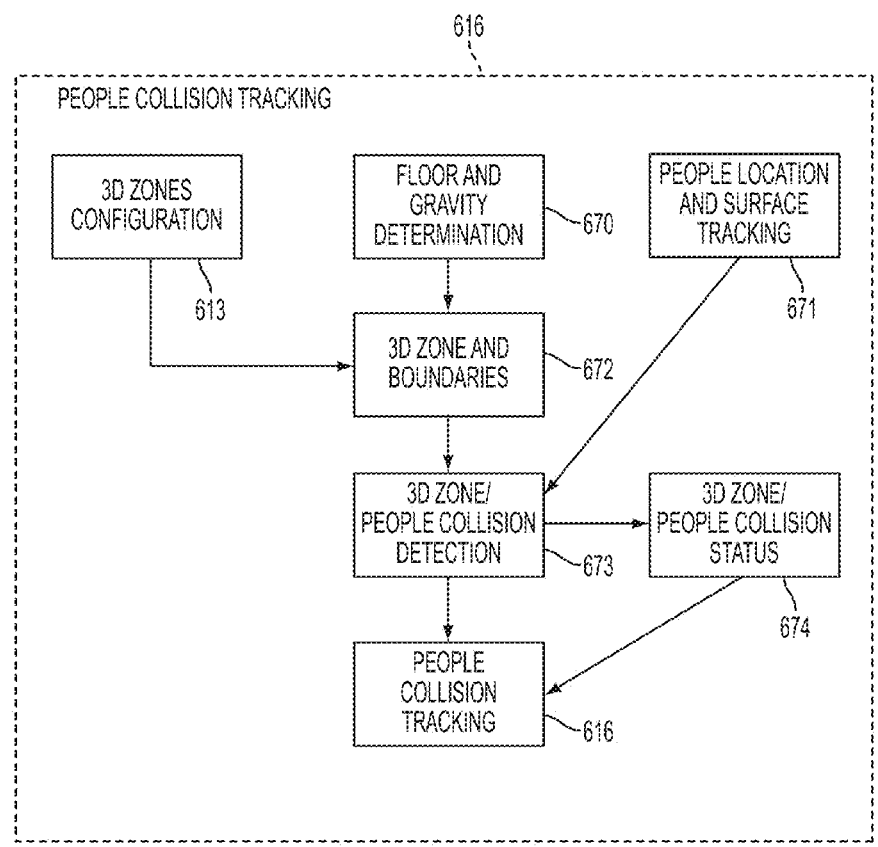

FIG. 6D illustrates additional detail on the people collision tracking module 616. The volume each configured 3D zone occupies is calculated through the data intrinsics of the used device 511 (transforming distance from the device 511 to the vertex of the coverage zone 508 into 3D locations in space) and the current orientation of the device 511, determined by the Floor and Gravity Determination module 670. Under some aspects of the disclosure, the location of the device 511 is known and no gravity or floor determinations are necessary. Once the 3D coverage zones 508 are in the same coordinate system as the tracked people's surface (which is a set of 3D points, e.g., included within the point cloud) and other characteristic 3D points of interest (such as the persons center of mass, which is the average for all surface points), as determined by the people location and tracking module 671, some calculations can be performed in order to determine which points of each person are inside of the boundaries of the 3D coverage zone 508, in module 672, based at least in part on information received from the 3D zones configuration module 613. When certain points belonging to the person are within a 3D coverage zone 508 boundaries, that person is said to be "colliding" with the 3D coverage zone 508, and thus some behavior will later be inferred from such collisions. These calculations are performed by the 3D Zone/People collision detection module 673.

3D coverage zones 508 can be of a different type according to their behavior with respect to collisions.

"Engagement Zones" 506 are usable to determine how people interact. These zones use previously identified body parts (or potentially any body part if no distinction is made) of the person's surface contained partially or totally in the volume of the engagement zone 506 to enable a "collision" state.

"Coverage Zones" 508, when typically one or more characteristic points of the person are contained by the coverage zone 508 volume in order to establish a collision with the person and the coverage zone 508. Some typical characteristic points are for example the center of mass, the highest point from the floor, the center of the head, a certain point in the body, like the middle of the shoulders. Other points may be ignored for this analysis.

A history of each person's collisions with coverage zones 508 and engagement zones 506 can be maintained in the 3D Zone/People collision status module 674. In some configurations, the history is kept for as long as a person is colliding with the given zone. In some configurations, the history can be erased as soon as the person leaves the coverage zone 508 of the devices 511. Under some aspects of the disclosure only the last collision is kept, under others a variable number of collisions is kept or all of them. This information is crucial for the Collision Tracking module 616, which determines the exact moment(s) when a person starts a collision with a 3D coverage zone 508 or engagement zone 506, keeps colliding with the respective 3D zone or ends a collision with the respective 3D zone. It also knows the coordinates of the colliding points in order to provide information determinable from them (like the average location, or the points closer to a certain place).

People Collision Tracking 616 can also determine different types of behavior to, e.g., collisions with either of the respective 3D coverage zone 508 or 3D engagement zone 506 mentioned before, like transforming a "coverage zone 508" into a "checkpoint zone" 520 or adding a checkpoint zone 520a, 520b, e.g. between adjacent coverage zones 508a and 508b or coverage zones 508b and 508c, e.g., as shown in FIG. 5D. As an example a checkpoint zone 520a or 520b may trigger just one collision event when the person respectively enters the coverage zone 508b on one side and exits the coverage zone 508b on a different side, e.g., as is illustrated in FIG. 5D. FIG. 5D shows, by way of example, what can be determined using a plurality of 3D scanners, e.g., three 3D Scanners 512 in FIG. 5C or 5D, with their respective overlapping coverages. This overlapping can also produce a plurality, e.g., two, of "checkpoint zones" 520a and 520b in the middle separating them as noted above. Whenever a person goes through one of those checkpoint zones, 520a, 520b the event can be recorded in both covering 3D scanners, 512, and then that information can be used to merge the persons into one single unique ID.

This can mean, for example, knowing that a person went through a door at a particular time and in a particular transit direction. Another example would be transforming an "Engagement Zone" 506 into a "Coverage Zone" 508 and tracking events, e.g., every time the contact of the person moves to a coordinate(s) in the engagement zone 506, similar to tracking the user touching a touch screen surface at a specific location, and tracking these collisions/touches.

People Collision Tracking module 616 can also detect and track the exact times when an action(s) happens, so some meaningful information can be extracted like "time touching a certain element" or "time it took a person to move from here to there".

Under some aspects of the disclosure, respective 3D zones, e.g., coverage zone 508 or engagement zone 506 and sub-zones or special information tracking zones within these, can all be further sub-divided into smaller detailed zones, for instance by the use of a planogram or some other sort of map. Each of the smaller detailed zones (not shown) can provide one more level of detail into the nature of the collision. For example, grabbing product X from shelf number Y, entering by the lower left section of the hallway or sitting in the middle cushion of the couch. The system can be configurable to correlate the planogram's locations to the location inside of the engagement zone 508. For example, FIG. 9 shows a representative planogram 900 for engagement zone 814 in FIG. 8B. A subdivision of this planogram in the smaller detailed zone 910 allows knowing that when the person is touching that particular sub-zone of engagement zone 814, the person is actually touching a particular product contained within the detailed subzone zone, a surface of which is marked as 910 in the planogram.

Figure 6E:
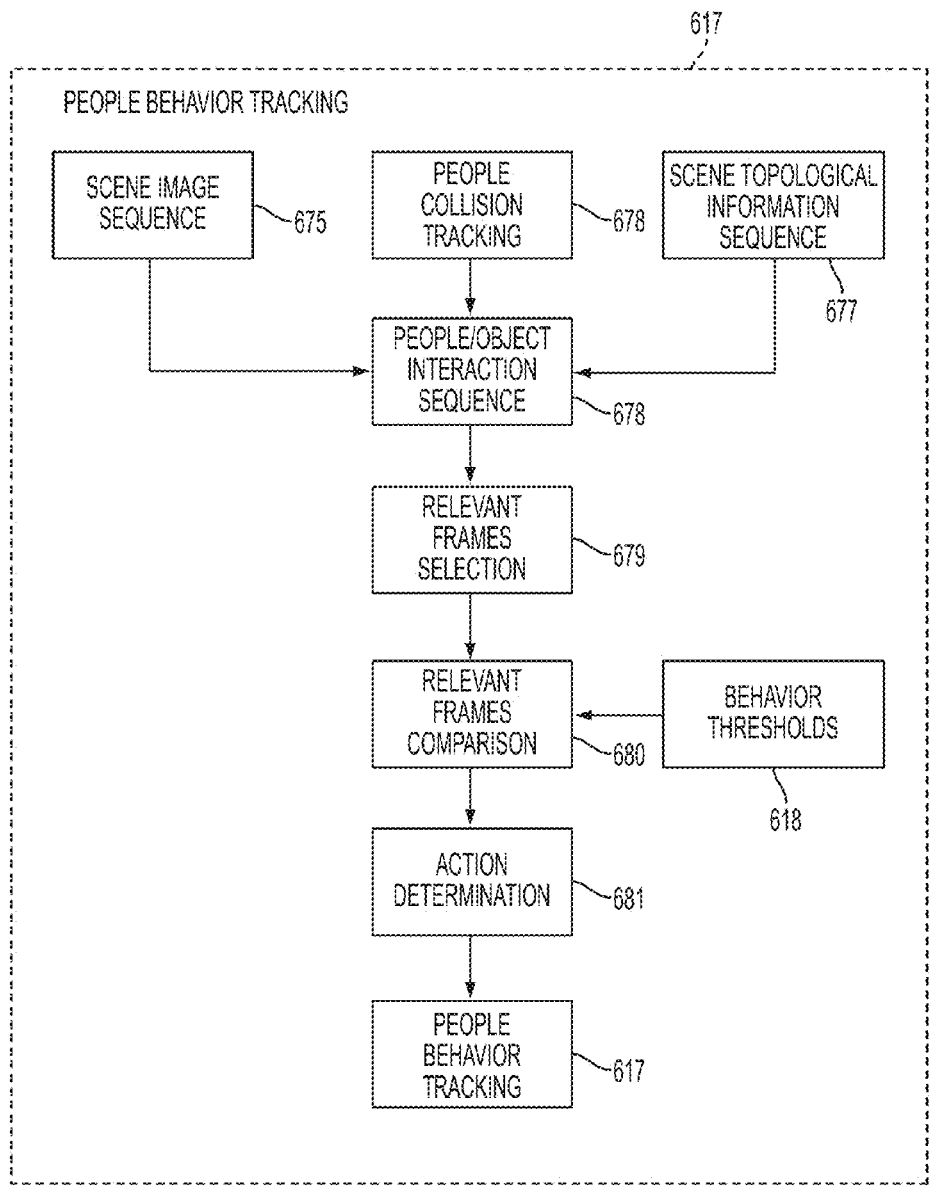

FIG. 6E illustrates a people behavior tracking module 617 with additional detail. Tracking module 617, enriched under some aspects of the disclosure by images, topological information or other 3D scanner 650 provided data, such as may be obtained from the point cloud, a sequence of the whole interaction between a person and a respective 3D zone is kept 678, e.g., including information extracted, e.g., from a scene image sequence 675. Under some aspects of the disclosure parts or all of the sequence 675 can be discarded as it happens, just to keep the relevant information that should be compared when the action is finished. This relevant information could be a scene topological information sequence 677, e.g., as may be determined from the point cloud, e.g., at just the time when the collision started, the surface volumes, the collision coordinates, or the whole color image sequence evolution of the collided area and its surroundings as taken by the 3D scanner 650, and in the form of selected relevant frames 680, which may contain one or more of the point clouds.

Once a certain threshold of interest 618 is achieved (for example, ending the collision, moving a certain distance changing volumes or colors), the selected relevant frames 679 for the behavior are compared 680. This comparison comprises criteria and thresholds that could be embedded into the system e.g., at 618, dynamically determined due to certain conditions (like lighting or some object colors) or trained into the system. The result of the comparison 680 characterizes the sequence with an action 681. Some possible actions are touching an object, picking up an object, putting an object into a zone, staying longer than a threshold time, getting closer than a certain distance, changing a characteristic like height while in a zone (i.e.: crouching or jumping), changing other characteristics while in a zone (for example, trying on a jacket), engaging in physical contact with other people or objects while in the zone (for example, letting go or grabbing a shopping cart).

Under one embodiment of the solution, an image of the hand entering the zone can be compared with an image of the hand leaving the zone, and through color analysis the action can be classified in a "pick-up" if new colors in the second image go over a certain threshold, "return" if certain colors where diminished in the second image or "touch" if colors kept fairly balanced. The action determinations from module 682 can be utilized to provide a people behavior tracking output 619 of the overall people behavior tracking module 617.

The People Behavior Tracking module 617 takes all this information and generates People Behavior and Location Events, i.e., in people tracking module 619. These events are behaviors associated with a certain person, so they may contain some or all of the following information:

The ID of the person performing the behavior.

The respective 3D zone's identifier and type.

A set of behavior data identifying the behavior to be tracked (e.g.: entering a particular place, staying, crouching, moving, going through a place in a particular direction, grabbing or returning a certain product from a certain part of the shelf, intruding into a restricted area).

A set of times of interest, like when the action began and when it finished.

A set of coordinates of interest, like the location where the hand entered the area and the location where it left.

Figure 6F:
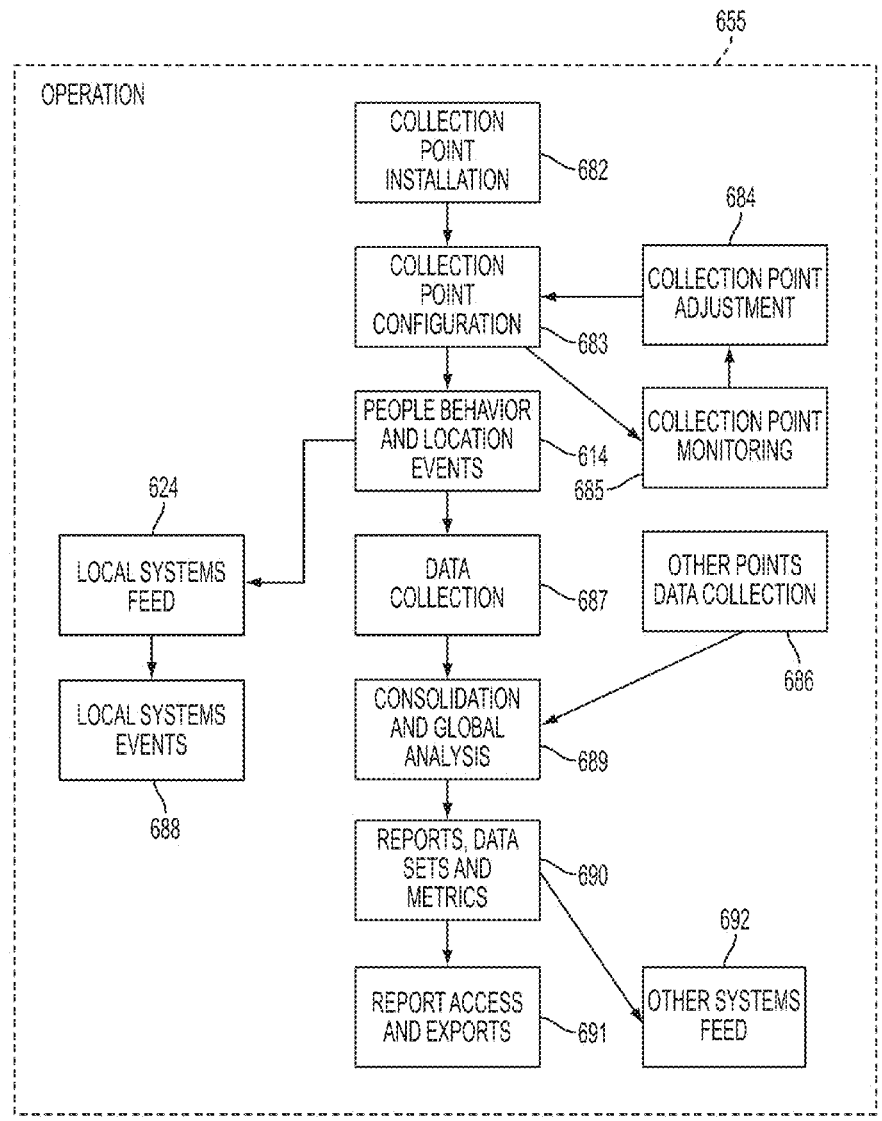

FIG. 6F illustrates an operation 655. 3D scanners 650 (typically cameras and detection devices such as structured light 3D scanners) are installed 682 above of the area of interest, at a distance and an angle, can form a coverage zone 508 configuration 683 that allows direct line of view with the interaction with elements that will be studied, e.g., in an engagement zone 506. This line of sight should be such that the person won't occlude from the view of the 3D scanner 650 his or her own actions. As will be appreciated by those skilled in the art, a variety of 3D scanner 650 types can be employed without departing from the scope of the disclosure. The system may, through coverage zone 508 monitoring 685, make adjustments 684 in the coverage zone 508. The information gathered may be utilized to provide people behavior and location event information 614, as noted above. The data collection 687 may provide information to the consolidation and global analysis module 689, 620 in FIGS. 6A and 6B, which may supply reports data sets and metrics 690, 630, 632, 634 in FIGS. 6A and 6B, which may be provided to another systems' feed 692 and to a report access and exports module 691. The people behavior and location events module 614 may provide information to a local events feed 624 to a local systems events module 688.

Figure 7A:
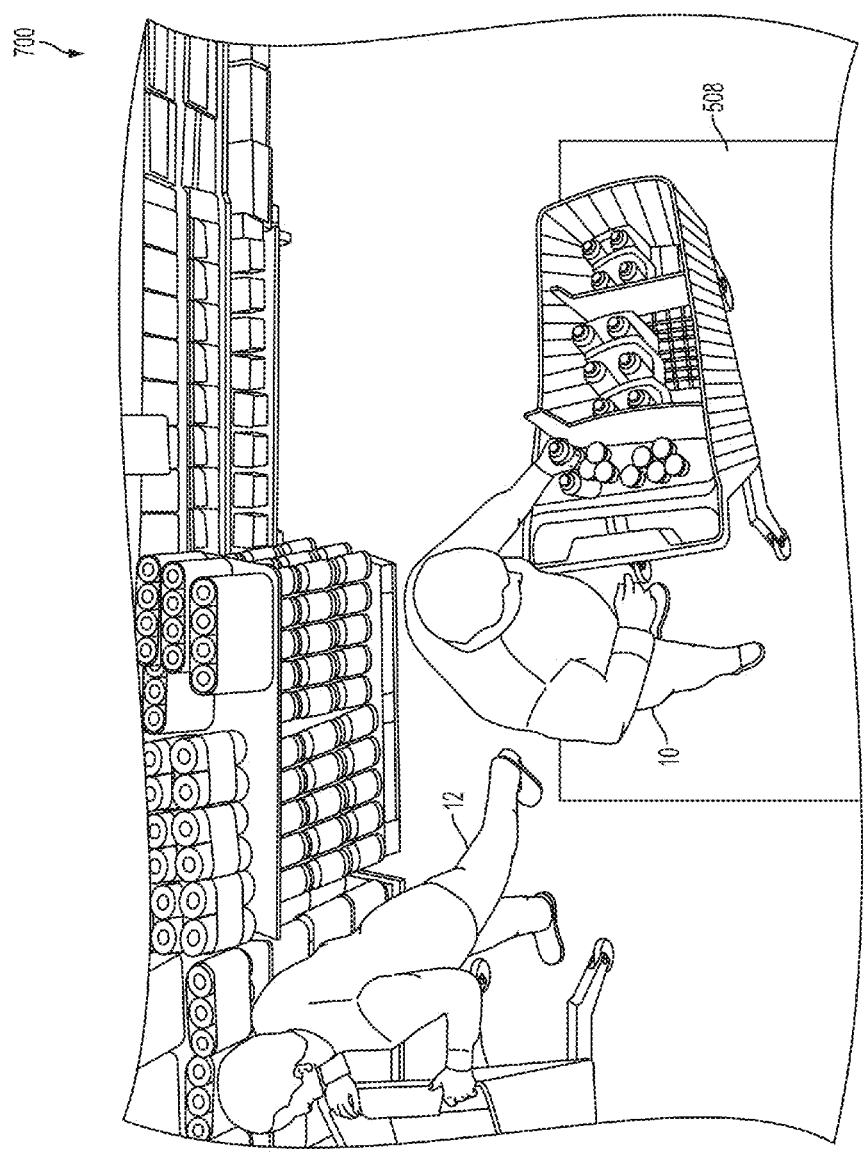

FIG. 7A is a still image screen shot of a planogram 700 of two persons 10, 12, respectively in and out of a coverage zone 508, a three dimensional space extending from a 3D scanner 650 to the floor, with the main person 10 in the center having a shopping cart.

FIG. 7B illustrates a digitized depth map representation of the planogram 700 of FIG. 7A, with location and surface tracking of the people 10, 12, in the screen shot image shown in FIG. 7A. Each person 10, 12, e.g., can be painted in a different color, e.g., with the darkness of the color(s) denoting distance to the 3D scanner 650 (the color black corresponds to "no data").

Figure 8B:
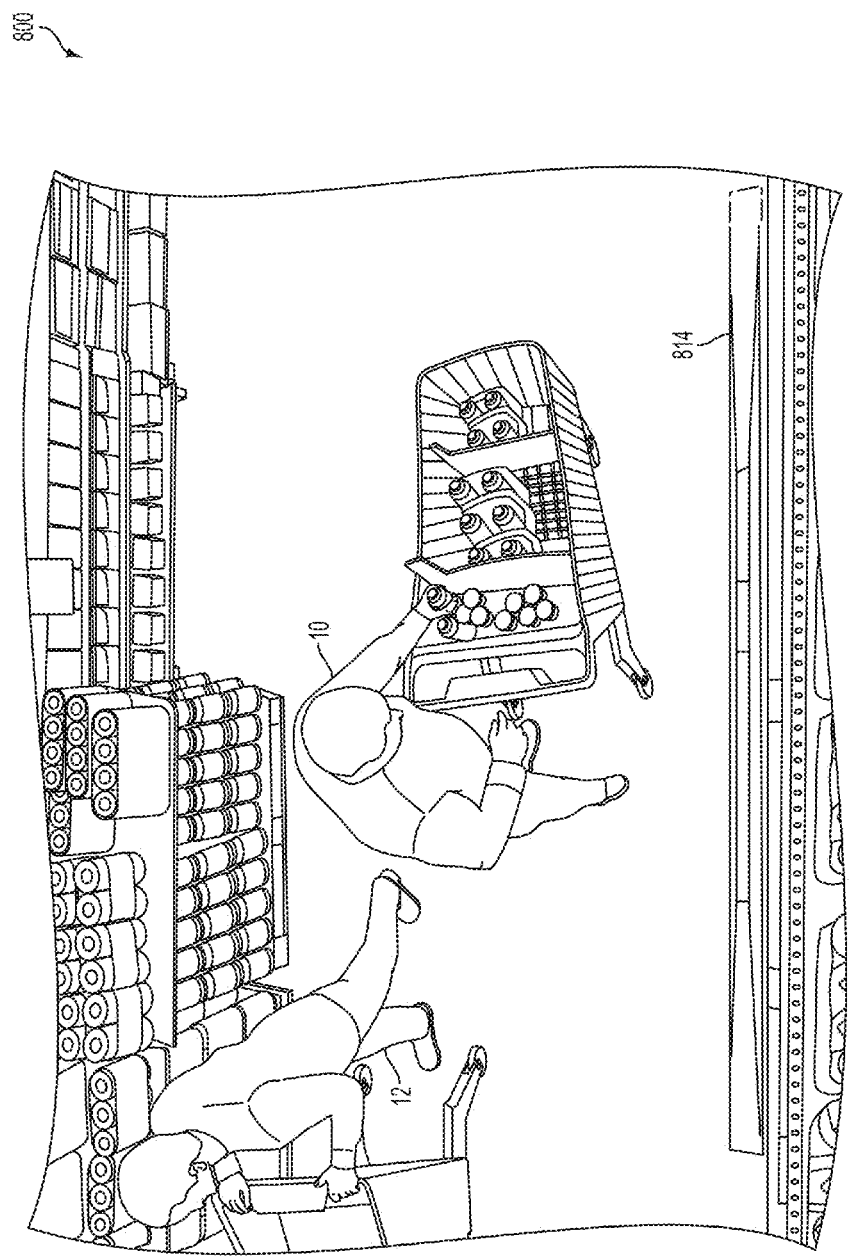
Figure 9:
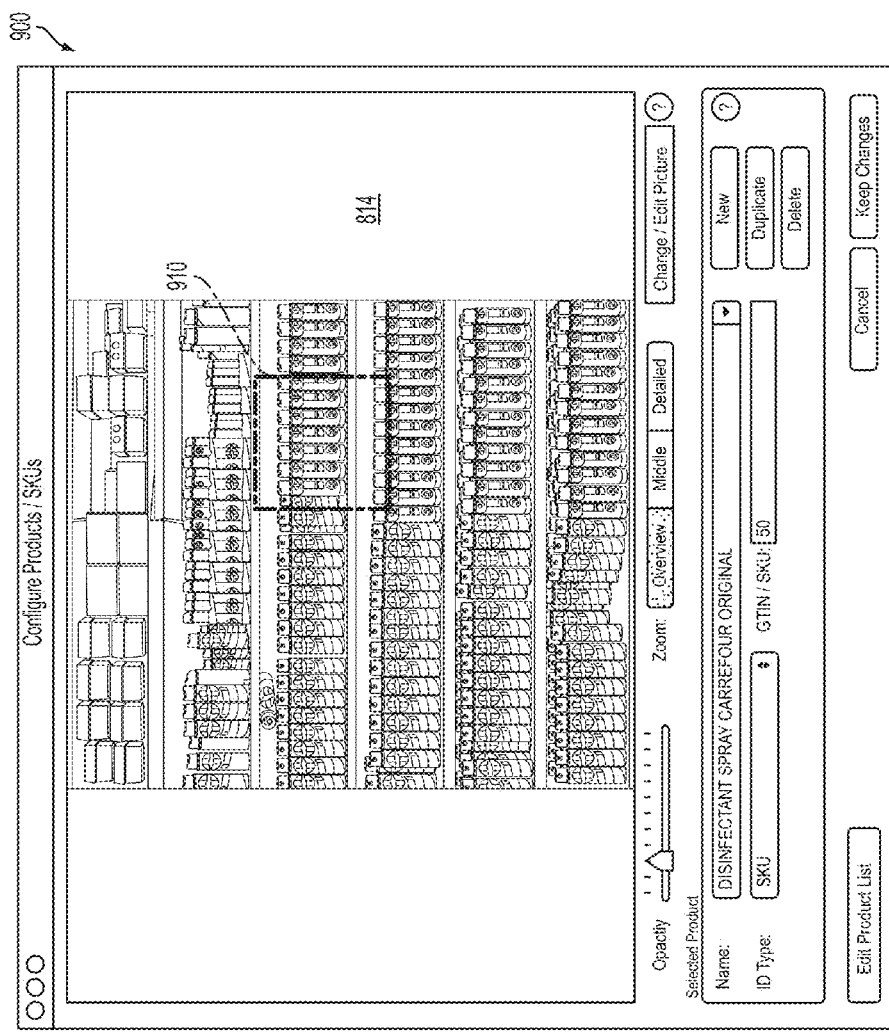
FIG. 9 is a screen shot of a planogram for marking an interaction by a shopper with an item in a target location in a detailed zone.

FIGS. 8A-B are screen shot images 800 of a person 10 contained by a three dimensional coverage zone 810 and a person 12 outside the coverage zone 810. As will be appreciated by those skilled in the art, the configuration of 3D coverage zone 810 can either be configured manually or automatically. Additionally, each coverage zone 810, if there are more than one, can be configured to contain engagement zones 506 (814, shown in FIG. 8B), perhaps also with sub-zones therein, as illustrated by way of example in FIG. 9. These zones can be used in order to understand each person's interactions with the environment within the respective zone(s). These zones can either be volumes that a person's surface or a part of the person can occupy or go through, or touch (collide) with a part of their body.

FIG. 8B illustrates an engagement zone 814 which can be used, e.g., to determine, e.g., when a person 10 puts a hand in the engagement zone 814 at a certain location and/or within a certain sub-zone of the engagement zone 814, corresponding to, e.g., a certain area of a covered shelf by colliding with and/or going through the respective zone, as illustrated in FIG. 9.

FIG. 9 is a screen shot 900 of an interface for marking an item in a target location, e.g., a sub-zone 910, of the engagement zone 814 in FIG. 8. This interface 900 enables a system user to configure the sub-zone 910 to be an identification of, e.g., a product location on a shelf within the engagement zone 814 of FIG. 8, and, e.g., determine for the previous area 814 in FIG. 8B, where each product is located, e.g., inside a 3D sub-zone 910 of a 3D engagement zone 814, with the target product location in the sub-zone 910 of the engagement zone 814 being highlighted. Additional fields are provided including, but not limited to, name of product, ID type (such as SKU), and GTIN/SKU.

Figure 10A:
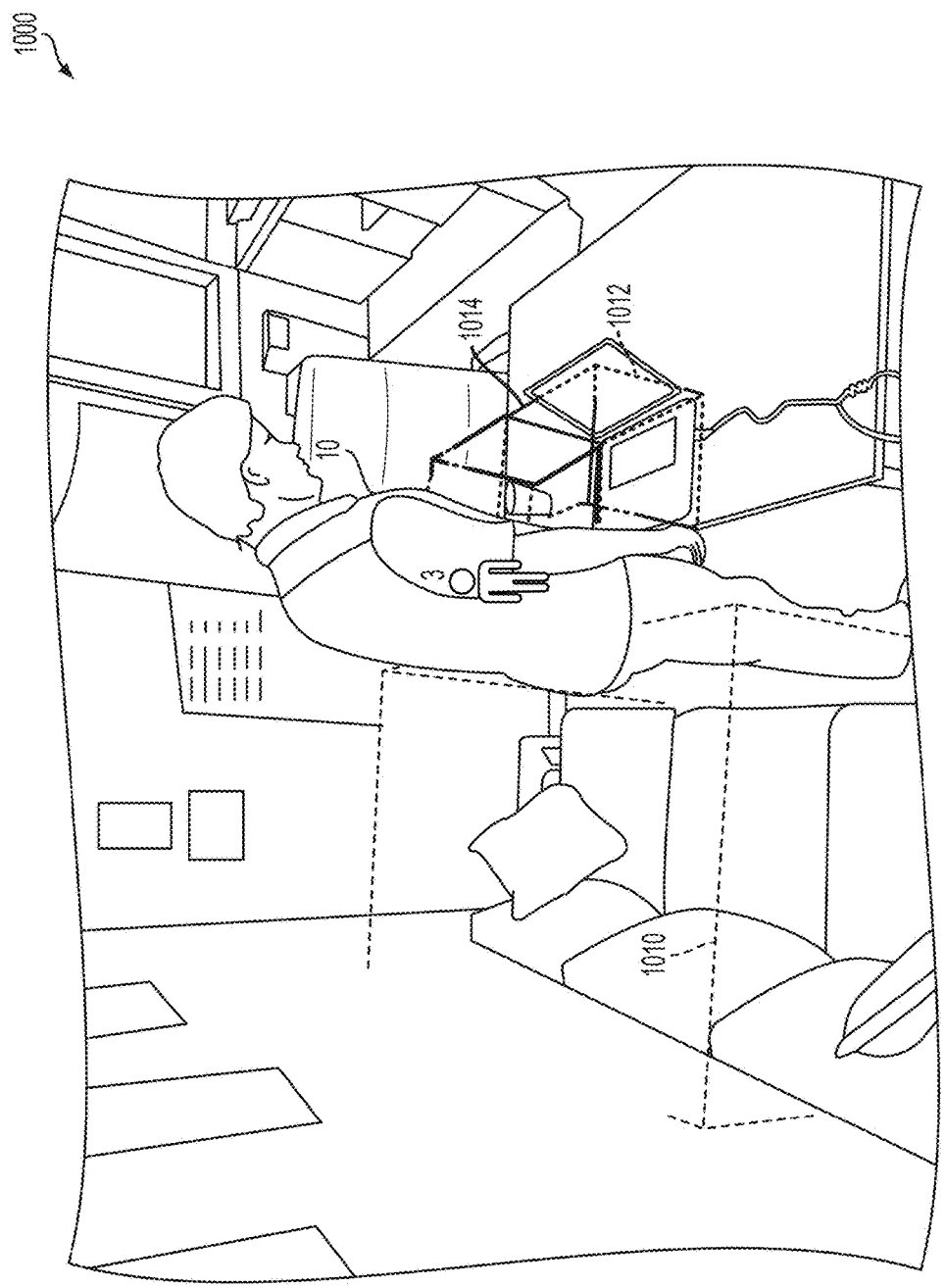
FIGS. 10A-E are screen images of planograms illustrating interaction of a person with one or more defined detailed zones in three-dimensional engagement spaces.
Figure 10B:
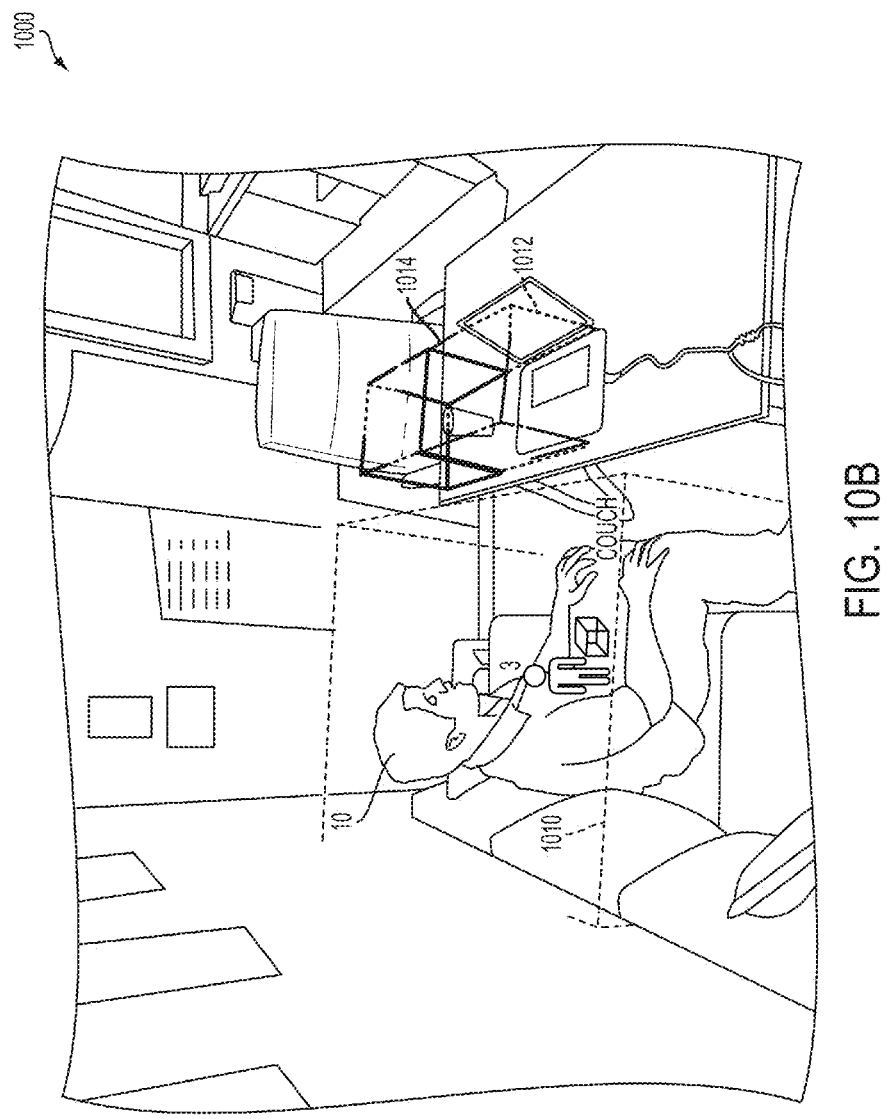
Figure 10C:
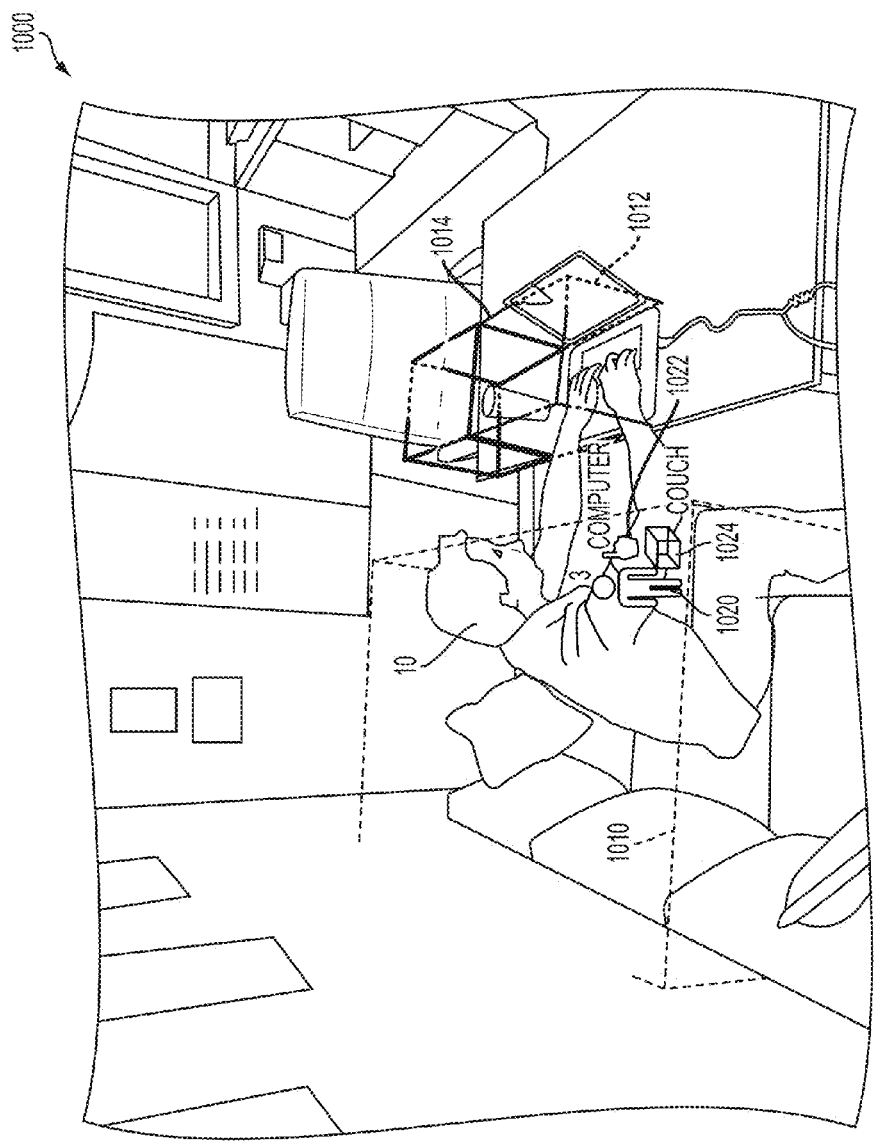
Figure 10D:
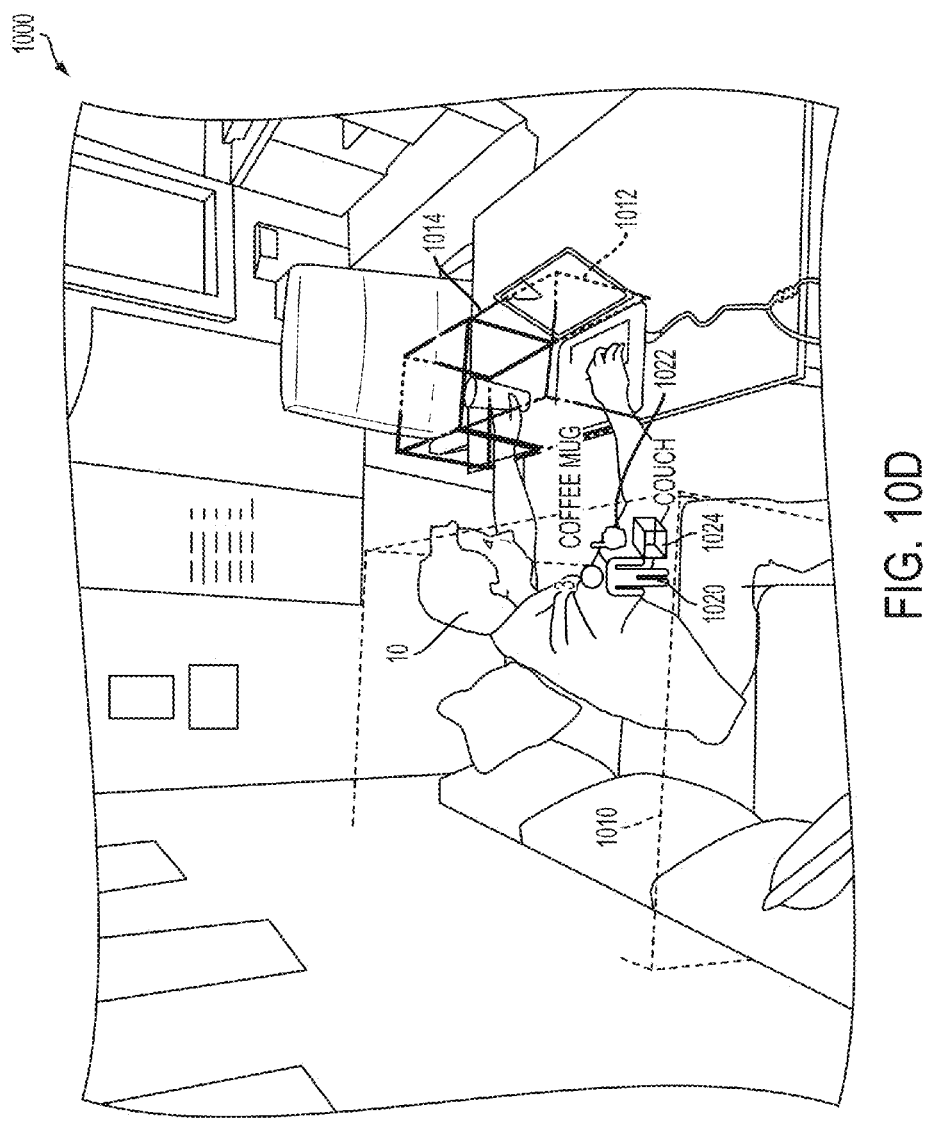

FIGS. 10A-E are screen shots of an illustrated example of another system planogram 1000, used in another environment, such as an office space. In FIG. 10A, a person 10 marked as #3 (1020 in FIG. 10C), does not collide with any of the three dimensional sub-zones, e.g., engagement zones 1010, 1012 or 1014, as an example, the center of mass of the person 10, represented by the small cube (1024 in FIG. 10C) in the screen shot, is within a coverage zone encompassing the three dimensional sub-zones, 1010, 1012 or 1014, but not within any of the engagement zone sub-zones 1010, 1012 or 1014 This can be used to identify items in the respective engagement zones defined by the sub-zones 1010, 1012 or 1014 of the coverage zone, such as the seating area 1010, the laptop 1012, or the area adjacent the laptop 1014. FIG. 10B illustrates a center of mass 1024 for a person 10 within a defined 3D sub-zone, engagement zone 1010, which is defined as sitting on the couch. FIG. 10C illustrates in the screen shot the person 10 with arms (1022 in FIG. 10C) and hands inside the 3D sub-zone, engagement zone 1012, which is defined as touching the laptop computer. FIG. 10D the person 10, is touching/interacting with the 3D sub-zone, engagement zone 1014, associated with the side of the laptop 1012 and a coffee mug. From this illustration, it is apparent that using a person's location and one or more sub-zone surface definitions, plus the collision history and current collision state, this system is configurable to gather data from which to determine behavior. This behavior defines actions containing information like "at this exact time, the person with the ID number X entered the sub-zone 1010 named 'couch'" or "at this time the person X entered the sub-zone 1012 "computer' with the hands at this location" or "at this time this person picked-up a coffee mug from this sub-zone 1014 location on the table defined by the respective 3D sub-zone 1014".

Figure 10E:
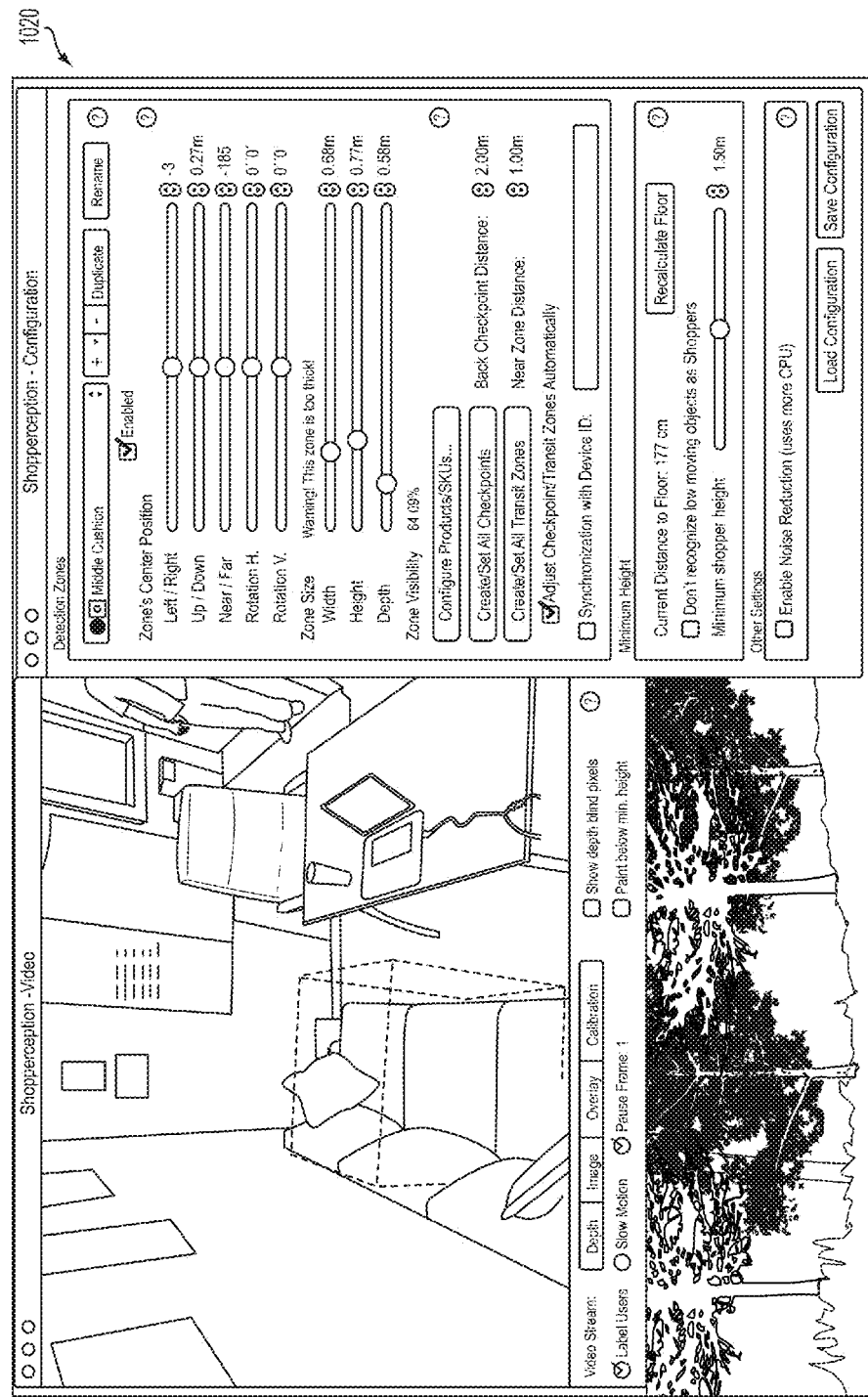

FIG. 10E illustrates a screen shot of a computer screen interface 1020 showing manual and assisted configuration. The person configuring the tool uses the sliders on the right in order to position and resize the respective 3D engagement zone and/or sub-zone, and the system informs both visually and with numbers the location of the respective 3D engagement or 3D sub-zone and its interactions with the scene (in this case, drawing only the visible edges). Objects inside of the respective 3D engagement zone and/or 3D sub-zone of a 3D engagement zone can be painted a different color so the user understands exactly where it is.

Automated configuration can comprise the unattended definition of 3D engagement zones and/or sub-zones, e.g., within a coverage zone determined, e.g., by the 3D scanner being used, based on received 3D scanner output data and other external system feeds, such as information provided by a planogram system with the location of each element, e.g., desired to be monitored. Such a configuration comprises 3D coverage zones based on the location of the 3D scanner and orientation, detection of physical elements (such as determining which spaces are "floor" and as such are subject to human transit, or which spaces are not "floor" and then subject to being interacted with by a person in transit), detection of certain predefined elements by their appearance—such as markers with particular colors and/or patterns—and automated image stitching in order to calculate continuity between different 3D coverage zones for different 3D scanners.

The configuration also involves informing the system (either manually or using automated network discovery services) of other systems that should be informed of the behavior events in real time, such as advertising displays, coupon printers or spray dispensers. These systems can then trigger events in response to the person's behavior, like spraying an air fresher for every X visits to the room, or displaying a targeted advertisement when a person reaches for a particular product in a shelf.

Under an aspect of the disclosure, it presents either locally or remotely monitoring information that informs either a person or a system of its status and performance—for example, the amount of people tracked so far or a malfunction within the system or a sensor. This information can trigger either manual or automated adjustments to the system or the configuration, such as, restarting a sensor, moving a 3D zone in response to a change of location or orientation, or updating a planogram.

Once the 3D coverage zone has been configured/reconfigured, it generates information on the people and their behavior as explained above.

Under an aspect of the disclosure this information, can be collected and stored at the point of collection by the system at the 3D coverage zone and transmitted to the consolidation and global analysis component, referenced above, in different ways, depending on the available infrastructure. Under one scenario, this transmission is performed over a local or wide area network directly from the location where the information capture is happening. Under other scenarios where there is no connectivity, this data needs to be moved from the location by other means, either by removing the sensor into another location with network access or transporting the data into a movable storage device, such as a USB drive.

The collected information from all the necessary related 3D coverage zones (at least one) can then processed by the consolidation and global analysis module, as described before, producing the above described behavior metrics, reports and data sets. These reports and information can then be viewed, analyzed, shared and exported from a user-friendly interface, in the form of charts, tables, and reports, and consumed through a variety of devices such as a web browser, a mobile phone application or a tablet. Under an aspect of the disclosure this data can also be automatically imported into other systems that can use this information for example for detecting patterns, business intelligence analysis, data mining, market predictions, triggering alarms or showing business performance indicators.

Figure 11A:
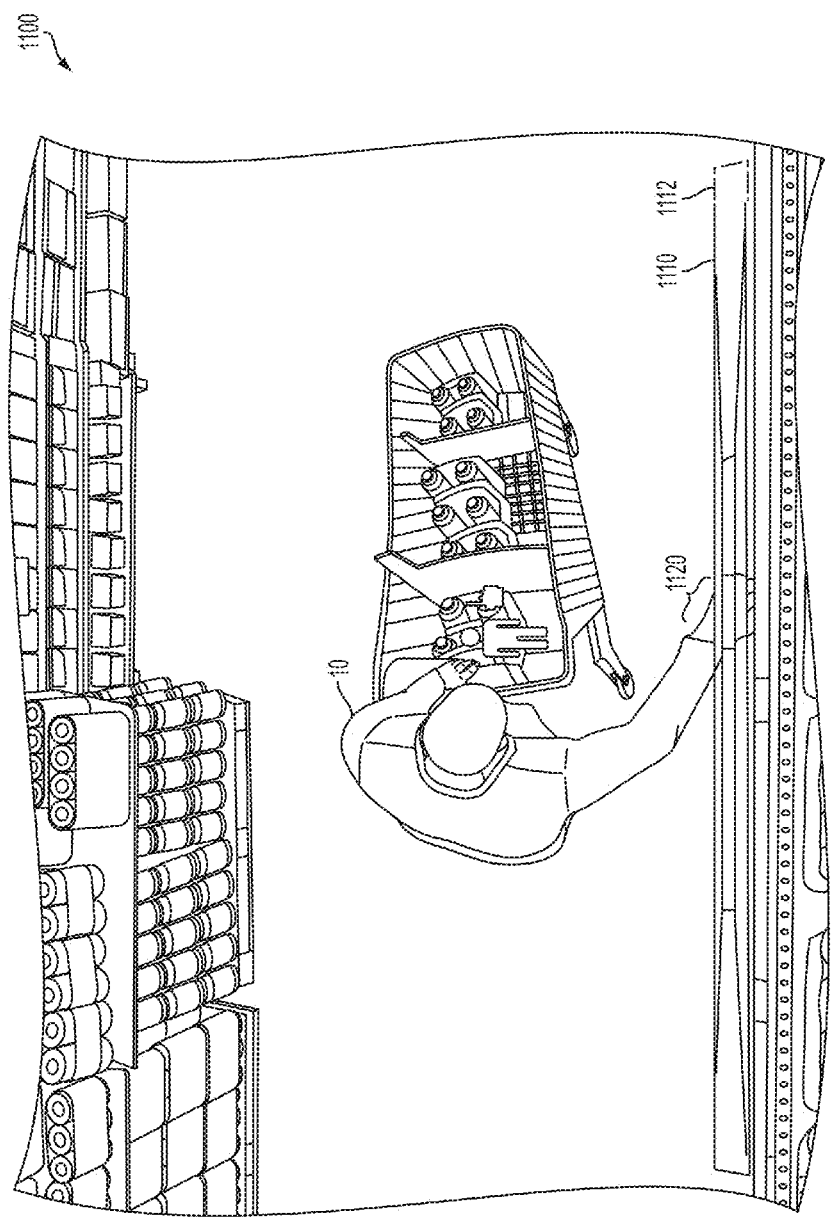
FIGS. 11A-B are screen images of planograms illustrating a person interacting with an item on a store shelf corresponding to a detailed engagement zone.
Figure 11B:
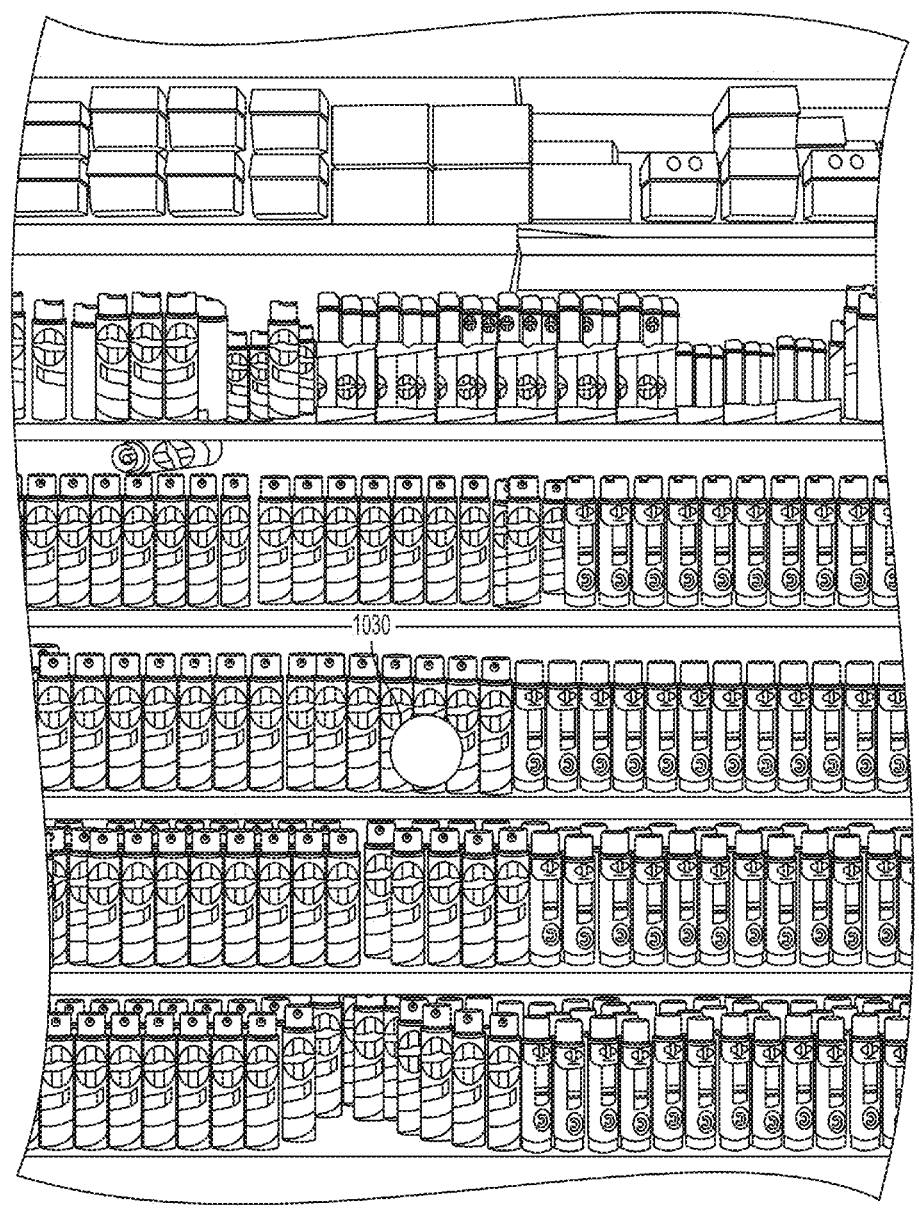

FIGS. 11A-B illustrate screen shots of a planogram 1100 in which a person 10 is colliding with the engagement zone 1110 at a point 1120, e.g., defined by a respective 3D sub-zone. From the configuration of the definition of the 3D engagement zone 1110, and the location of the collision, e.g., within a defined 3D sub-zone 1120. within the engagement zone 1110, a determination is made that item 1130 was selected from the shelf, as illustrated in FIG. 11B.

In some configuration of the system a full service system can be provided for shopper studies in select projects (hardware, installation, configuration, capture, analysis) or just access to the data based on the amount of sensors used, days and level of information wanted (e.g.: just aggregate data, detailed data and/or shopper/event pictures). The latter can involve a trained partner that makes the hardware investment and performs all the other tasks, like installing and configuring the sensors.

Additional implementations include, but are not limited to:

preparing and selling reports based on the captured data,
preparing and selling indexes made with the captured data for products, locations or product categories.
selling advertisement(s) on site, ideally through a real-time bidding process ("a user is grabbing a coke, check which advertiser pays more for this event and display an ad").
providing access to real-time behavior on site, meaning people locations and interactions, as a service for mobile apps, and/or using people and location surface tracking for other interaction systems.

It will be understood that a system and method for determining information about an interaction of a three dimensional object of interest occurring within a three dimensional zone of interest may comprise a point cloud 3D scanner which may comprise an image frame generator configured to generate a point cloud 3D scanner frame comprising an array of depth coordinates for respective two dimensional coordinates of a surface of the object of interest, within the three dimensional zone of interest, comprising a three dimensional coverage zone defined by the location and orientation of the point cloud 3D scanner and encompassing within the three dimensional coverage zone a three dimensional engagement zone; and wherein the point cloud 3D scanner frame comprises a three dimensional depth map of the object of interest within the three dimensional coverage zone or within both the three dimensional coverage zone and the three dimensional engagement zone; a memory configured to store temporally separated point cloud 3D scanner image frames; a computing device configured to compare respective temporally separated point cloud 3D scanner image frames and determine the time and location of a collision between a surface of the object of interest and a surface of at least one of the three dimensional coverage zone or the three dimensional engagement zone encompassed by the dimensional coverage zone. At least one three dimensional sub-zone may be encompassed within one or both of the three dimensional coverage zone and the three dimensional engagement zone; and the computing device may be configured to compare respective temporally separated point cloud 3D scanner image frames; and determine the time and location of a collision between a surface of the object of interest and a surface of the at least one three dimensional sub-zone.

The system and method disclosed may comprise wherein the object of interest is a person and the surface of the object of interest is on a portion of the body of the person. The system and method may comprise the computing device being configured to utilize the time and location of the collision between the surface of the object of interest and the at least one of the surface of the three dimensional coverage zone or the three dimensional engagement zone encompassed by the dimensional coverage zone to characterize the interaction by the object of interest with another object of interest within the three dimensional coverage zone, the three dimensional engagement zone or both. The system and method may comprise the computing device configured to utilize the time and location of the collision between the surface of the object of interest and the surface of the three dimensional sub-zone encompassed by at least one of the three dimensional coverage zone or the three dimensional engagement zone to characterize the interaction by the object of interest with another object of interest within the three dimensional sub-zone.

Another object of interest may comprise comprises a tracked product in a product location zone within the three dimensional engagement zone or a tracked product in a product location zone within the three dimensional sub-zone. The characterization of the interaction with another object of interest may be indicative of an activity of the person being performed with the another object of interest.

A non-transitory machine readable storage medium storing instructions which, when executed by a computing device, cause the computing device to perform a method, is disclosed where the method may comprise receiving from a 3D scanner a point cloud, where the sensor may comprise an image frame generator generating a point cloud 3D scanner frame comprising an array of depth coordinates for respective two dimensional coordinates of a surface of the object of interest, within the three dimensional zone of interest, comprising a three dimensional coverage zone defined by the location and orientation of the point cloud 3D scanner and encompassing within the three dimensional coverage zone a three dimensional engagement zone; and wherein the point cloud 3D scanner frame may comprise a three dimensional depth map of the object of interest within the three dimensional coverage zone or within both the three dimensional coverage zone and the three dimensional engagement zone; storing in a memory temporally separated point cloud 3D scanner image frames; and comparing respective temporally separated point cloud 3D scanner image frames and determining the time and location of a collision between a surface of the object of interest and a surface of at least one of the three dimensional coverage zone or the three dimensional engagement zone encompassed by the dimensional coverage zone. At least one three dimensional sub-zone may be encompassed within one or both of the three dimensional coverage zone and the three dimensional engagement zone; and the method may further comprise comparing respective temporally separated point cloud 3D scanner image frames and determining the time and location of a collision between a surface of the object of interest and a surface of the at least one three dimensional sub-zone.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for determining information about an interaction of a first three-dimensional object of interest occurring with a second three-dimensional object of interest within a three dimensional zone of interest comprising:
   a point cloud 3D scanner positioned at first location comprising an image frame generator configured to:
   generate a 3D engagement zone having a height a width and a depth from a point cloud 3D scanner frame comprising an array of depth coordinates for respective two dimensional coordinates of a surface of the object of interest, within the three dimensional zone of interest, comprising a three dimensional coverage zone defined by the location and orientation of the point cloud 3D scanner and encompassing within the three dimensional coverage zone a three dimensional engagement zone, and wherein the point cloud 3D scanner frame comprises a three dimensional depth map of at least part of a surface of the object of interest within the three dimensional coverage zone or within both the three dimensional coverage zone and the three dimensional engagement zone;
   a memory configured to store temporally separated point cloud 3D scanner image frames;
   and
   a computing device configured to:
   divide the 3D engagement zone into one or more two-dimensional sub-zones by use of a planogram;
   correlate a sub-zone location to a sub-zone height and a sub-zone width inside the two-dimensional sub-zone of the 3D engagement zone;
   determine a location of the second three-dimensional object of interest within the two-dimensional sub-zone;
   compare respective temporally separated point cloud 3D scanner image frames and-determine a time and a location of a collision between a surface of the first three-dimensional object of interest and a surface of the second three-dimensional object of interest within the two-dimensional sub-zone, and a surface of at least one of the three dimensional coverage zone or the three dimensional engagement zone encompassed by the three dimensional coverage zone;
   generate a two-dimensional image of the two-dimensional sub-zone with a marker positioned at one or more collision locations between the first three-dimensional object of interest and the second three-dimensional object of interest on the two-dimensional image;
   and wherein the object of interest is a person and the surface of the object of interest is on a portion of a body of the person.

2. The system of claim 1, wherein the object of interest is a person and the surface of the object of interest is on a portion of the body of the person and the system is further configured to determine a sequence of actions.

3. The system of claim 2, comprising:
   the computing device configured to:
   utilize the time and location of the collision between the surface of the object of interest and the surface of the three dimensional sub zone encompassed by at least one of the three dimensional coverage zone or the three dimensional engagement zone to characterize the interaction by the object of interest with another object of interest within the three dimensional sub zone; and further configured to analyze the sequence of actions to identify an interaction type.

4. The system of claim 1 further comprising:
the computing device configured to:
utilize the time and location of the collision between the surface of the object of interest and the at least one of the surface of the three dimensional coverage zone or the three dimensional engagement zone encompassed by the dimensional coverage zone to characterize the interaction by the first three-dimensional object of interest with another object of interest different than the second three-dimensional object of interest within the three dimensional coverage zone, the three dimensional engagement zone or both.

5. The system of claim 4 wherein the another object of interest comprises a tracked product in a product location zone within the three dimensional engagement zone.

6. The system of claim 4, wherein the characterization of the interaction with the another object of interest is indicative of an activity of the person being performed with the another object of interest.

7. The system of claim 1, wherein the another second three-dimensional object of interest comprises a tracked product in a product location zone within the three dimensional sub-zone.

* * * * *